US011965500B2

(12) United States Patent
Son et al.

(10) Patent No.: US 11,965,500 B2
(45) Date of Patent: Apr. 23, 2024

(54) LINEAR COMPRESSOR

(71) Applicant: LG Electronics Inc., Seoul (KR)

(72) Inventors: Sangik Son, Seoul (KR); Youngpil Kim, Seoul (KR); Kyungmin Lee, Seoul (KR); Wooju Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 17/078,468

(22) Filed: Oct. 23, 2020

(65) Prior Publication Data

US 2021/0123424 A1 Apr. 29, 2021

(30) Foreign Application Priority Data

Oct. 24, 2019 (KR) ........................ 10-2019-0133152

(51) Int. Cl.

| | |
|---|---|
| ***F04B 35/04*** | (2006.01) |
| ***F04B 39/00*** | (2006.01) |
| ***F04B 39/12*** | (2006.01) |
| ***F04B 53/14*** | (2006.01) |

(52) U.S. Cl.

CPC ........ *F04B 35/045* (2013.01); *F04B 39/0005* (2013.01); *F04B 39/12* (2013.01); *F04B 53/146* (2013.01); *F04B 39/0016* (2013.01); *F04B 39/0061* (2013.01); *F05B 2210/14* (2013.01); *F25B 2400/073* (2013.01)

(58) Field of Classification Search

CPC .... F04B 35/04; F04B 35/045; F04B 39/0005; F04B 39/002; F04B 39/0016; F04B 39/0061; F04B 39/12; F04B 39/14; F04B 53/146

USPC ................................. 417/417, 415, 416, 420

See application file for complete search history.

(56) References Cited

U.S. PATENT DOCUMENTS

| | | | | |
|---|---|---|---|---|
| 5,816,783 | A | 10/1998 | Oshima et al. | |
| 9,534,591 | B2 | 1/2017 | Roettger et al. | |
| 2006/0250032 | A1 * | 11/2006 | Her ....................... | F04B 35/045 310/13 |

(Continued)

FOREIGN PATENT DOCUMENTS

| | | |
|---|---|---|
| CN | 105332895 | 2/2016 |
| EP | 1126171 | 8/2001 |

(Continued)

OTHER PUBLICATIONS

Korean Notice of Allowance in Korean Appln. No. 10-2019-0133152, dated Mar. 26, 2021, 3 pages (with English translation).

(Continued)

*Primary Examiner* — Essama Omgba
*Assistant Examiner* — Chirag Jariwala
(74) *Attorney, Agent, or Firm* — Fish & Richardson P.C.

(57) ABSTRACT

A compressor includes: a cylinder defining a compression space, a piston structure accommodated in the cylinder and including a mount member and a guide member, the guide member being configured to reciprocate inside the compression space of the cylinder in an axial direction to compress a refrigerant gas therein and a magnet frame configured to support a mover, the mover being coupled to the piston structure and configured to move together with the piston structure. The mount member connects the guide member to the magnet frame and the guide member is configured to be rotated with respect to the mount member.

19 Claims, 17 Drawing Sheets

(56) References Cited

U.S. PATENT DOCUMENTS

| | | | | |
|---|---|---|---|---|
| 2008/0118375 A1* | 5/2008 | Muth | F04B 35/04 | 417/363 |
| 2008/0134833 A1* | 6/2008 | Lilie | F04B 35/045 | 74/581 |
| 2010/0275774 A1* | 11/2010 | Clemens | F16C 11/06 | 384/243 |
| 2018/0051683 A1 | 2/2018 | Hahn | | |
| 2019/0345924 A1* | 11/2019 | Hahn | F04B 39/1073 | |

FOREIGN PATENT DOCUMENTS

| | | | |
|---|---|---|---|
| EP | 1724466 | 11/2006 | |
| JP | S5830561 | 2/1983 | |
| JP | 2001123949 | 5/2001 | |
| KR | 100748546 | 8/2007 | |
| KR | 20090105469 A * | 10/2009 | F04B 39/00 |
| KR | 20180039959 | 4/2018 | |
| WO | WO9603601 | 2/1996 | |

OTHER PUBLICATIONS

Extended European Search Report in EP Appln. No. 20203527.5, dated Dec. 9, 2020, 5 pages.

* cited by examiner (a)

(b)

LINEAR COMPRESSOR

CROSS-REFERENCE TO RELATED APPLICATIONS

This application is based on and claims the benefit of priority to Korean Patent Application No. 10-2019-0133152, filed on Oct. 24, 2019, in the Korean Intellectual Property Office, the disclosure of which is incorporated herein in its entirety by reference.

BACKGROUND

The present disclosure relates to a linear compressor. More specifically, the present disclosure relates to a linear compressor that compresses a refrigerant by a linear reciprocating motion of a piston.

In general, compressors refer to devices configured to compress a working fluid such as air or a refrigerant by receiving power from a power generating device such as a motor or a turbine. The compressors are widely applied to the whole industry or the home appliances, in particular, a steam compression refrigeration cycle (hereinafter, referred to as a 'refrigeration cycle').

The compressors are largely classified into reciprocating compressors, rotary compressors, and scroll compressors according to a manner of compressing the refrigerant.

The reciprocating compressor uses a manner in which a compression space is defined between a piston and a cylinder, and the piston linearly reciprocates to compress a fluid, the rotary compressor uses a manner in which a fluid is compressed by a roller that eccentrically rotates inside a cylinder, and the scroll compressor uses a manner in which a pair of scrolls, each of which has a spiral shape, are engaged with each other to rotate so as to compress a fluid.

Recently, among the reciprocating compressors, the use of a linear compressor using a linear reciprocating motion without a crankshaft is gradually increasing. The linear compressor has the advantage of having a relatively simple structure and improving efficiency of the compressor because there is a little mechanical loss associated with converting rotational motion to linear reciprocating motion.

In the linear compressor, a cylinder may be disposed inside a casing defining a sealed space to provide a compression chamber, and a piston covering the compression chamber may be configured to reciprocate inside the cylinder. In the linear compressor, a fluid in the sealed space is suctioned into the compression chamber while the piston is disposed at a bottom dead center (BDC), and the fluid in the compression chamber is suctioned into the compression chamber while the piston is disposed at a top dead center (TDC). Here, the processes of compressing and discharging the fluid is repeatedly performed.

A compression unit and a driving unit are respectively installed inside the linear compressor, and the compression unit performs a process of compressing and discharging the refrigerant while performing a resonance motion by a resonance spring through the movement generated in the driving unit.

The linear compressor repeatedly performs a series of processes, in which while a piston reciprocates at a high speed inside a cylinder by the resonance spring, a refrigerant is suctioned into a casing through a suction tube and then is discharged from a compression space by the forward motion of the piston to move to a condenser through the discharge tube.

A structure in which a piston is directly coupled to a magnet frame is disclosed in Patent Publication No. 10-2018-0039959 A that is the prior art document. Referring to FIG. 4, in this case, when a piston is misaligned, the piston reciprocates inside the cylinder in an eccentric or inclined state to cause contact between the piston and the cylinder. When the piston contacts the cylinder, abrasion may occur on the piston and the cylinder to generate particles, and when fatigue due to the contact is accumulated, damage may occur. To prevent this limitation, there is a need to reduce a size of a contact pressure by applying a flexible structure to a movable portion of the piston.

The attempts to solve this limitation by inserting a flexible rod into the piston in a longitudinal direction is disclosed in US Patent Publication No. U.S. Pat. No. 9,534,591 B that is the prior art document. However, the flexible rod still has a limitation of losing its flexible function due to fatigue failure due to the repeated action of external force.

PRIOR ART DOCUMENT (Patent Document 1) Korean Patent Publication No. 10-2018-0039959 A (Published, Apr. 19, 2018)

(Patent Document 2) US Patent Registration No. U.S. Pat. No. 9,534,591 B2 (Registered, Feb. 3, 2017)

SUMMARY

Embodiments provide a compressor, in which when eccentricity of a piston occurs in a cylinder, moment acts on the piston by force of a lubricating refrigerant, which is provided from the cylinder, to prevent the piston from contacting an inner wall of the cylinder.

Embodiments also provide a compressor in which a piston is configured to be rotatable inside a cylinder so that self-aligning is enabled according to an increasing or decreasing pressure of the lubricating refrigerant.

Embodiments also provide a compressor, in which the center of gravity of a piston exists in a cylinder to minimize moment acting on a piston inside the cylinder.

In one embodiment, to prevent moment from acting on a piston by force of a lubricating refrigerant, which is provided from the cylinder, when eccentricity of a piston occurs in a cylinder, a compressor includes a piston structure, which includes a guide member configured to reciprocate inside a cylinder in an axial direction, and a magnet frame configured to support a mover that moves together with the piston structure, wherein the piston structure includes the guide member and a mount member connected to the magnet frame, and the guide member is coupled to be relatively rotatable with respect to the mount member.

The guide member may be coupled to be relatively tiltable with respect to the mount member so that self-aligning is enabled according to an increasing or decreasing pressure of a lubricating refrigerant.

The guide member may be coupled to be relatively rotatable with respect to the mount member so as to be tiltable in various directions.

To allow the piston to be rotatable inside the cylinder while being firmly fixed to a driver, the compressor may further include a shaft member passing through a driving shaft of the piston structure in an inner space of the guide member, wherein the mount member may include: a joint portion rotatably coupled to the shaft member; a mount extension portion extending backward from the joint portion; and a mount coupling portion extending outward from the mount extension portion in a radial direction, the mount coupling portion being connected to the magnet frame.

The compressor may further include a rotatable coupling member provided in a band or partial band shape coupled to an inner circumferential surface of the guide member to support the shaft member.

To allow the rotatable coupling member to be easily coupled, the rotatable coupling member may be provided to be cut in a circumferential direction and be press-fitted to the inner circumferential surface of the guide member.

To restrict forward movement of the rotatable coupling member, the guide member may have a front stepped portion of which an inner diameter of the guide member gradually increases backward from a first inner diameter to a second inner diameter, and the rotatable coupling member may be restricted in forward movement by being hooked with the front stepped portion.

To allow the piston to be freely rotatable, the rotatable coupling member may be rotatably provided inside the guide member.

The rotatable coupling member may have an outer diameter that is greater than the first inner diameter and less than the second inner diameter.

To restrict backward movement of the rotatable coupling member, the guide member may have a rear stepped portion of which an inner diameter of the guide member gradually decreases backward from a second inner diameter to a first inner diameter, and the rotatable coupling member may be restricted in backward movement by being hooked with the rear stepped portion.

The compressor may further include a joint portion through which the guide member and the mount member are rotatably coupled to each other, wherein the mount member may include: a mount extension portion connected to the joint portion to extend backward; and a mount coupling portion extending outward from the mount extension portion in a radial direction, the mount coupling portion being connected to the magnet frame.

To guide a flow of the refrigerant from the suction muffler to the inside of the piston, the mount coupling portion may be provided in a plate shape to define a communication hole configured to allow a suction muffler disposed behind the piston structure and the guide member to communicate with each other.

The mount extension portion may be provided in a bar shape that extends forward from a central portion of the mount coupling portion, and the hole may be defined around the mount extension portion.

The mount extension portion may be provided in a tubular shape that extends forward from a central portion of the mount coupling portion, and the mount coupling portion may have an opening through which the suction muffler disposed behind the piston structure and the guide member communicate with each other and to which the mount extension portion is connected.

To allow the piston to be rotatable in multiaxial directions, the guide member and the mount member may be coupled to each other through a ball joint, a spherical joint, or a universal joint.

The compressor further comprises a joint portion and a rotatable coupling member, which are configured to couple the guide member to the mount member, wherein the joint portion is connected to a mount extension portion that is provided in front of the mount member and inserted into the guide member to extend forward, and the rotatable coupling member is connected to a head portion that is provided in front of the guide member and comprises a suction port.

The joint portion and the rotatable coupling member are provided by coupling a ball and a socket to each other.

To allow a structure through which the piston is rotatable to be easily coupled, the head portion may have a suction valve coupling hole to be coupled to a suction valve at a front side thereof, and the rotatable coupling member may have a joint coupling hole communicating with the suction valve coupling hole.

The coupling member coupled to the suction valve coupling hole so that the suction valve is coupled to the head portion may be coupled up to the joint coupling hole through the suction valve coupling hole.

A rear end of the guide member may be disposed to be spaced apart from the mount member so that the piston is freely rotatable with respect to the structure configured to support the piston.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments disclosed in this discloser is described with reference to the accompanying drawings, and the same or corresponding components are given with the same drawing number regardless of reference number, and their duplicated description will be omitted.

In description of embodiments disclosed in this specification, it will also be understood that when an element is referred to as being "connected to" or "coupled with" another element, it can be directly connected to the other element, or intervening elements may also be present.

Moreover, In description of embodiments disclosed in this specification, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present discloser.

The terms used in the discloser may be replaced with terms such as document, specification, description.

Figure 1:
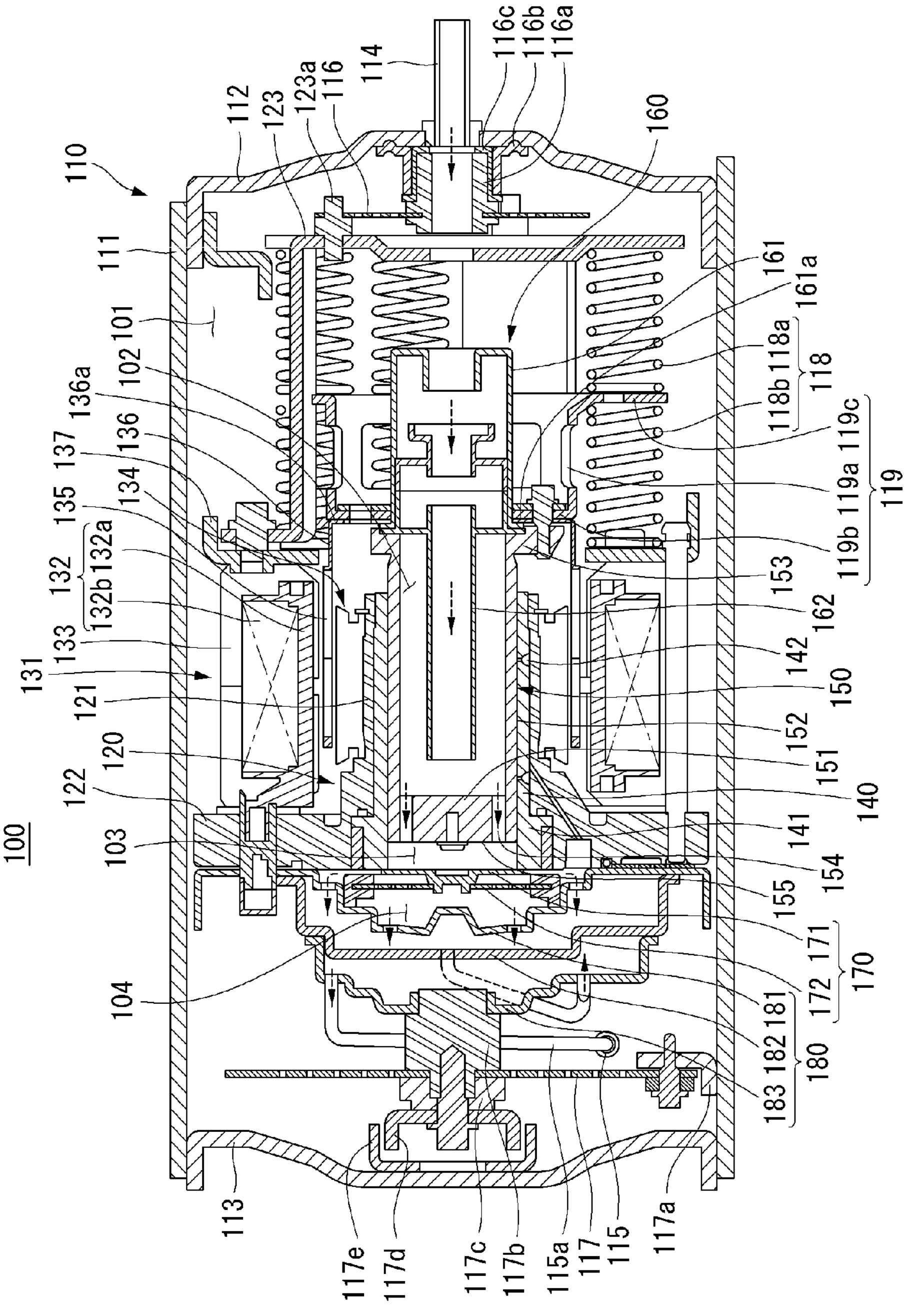
FIG. 1 is a cross-sectional view for explaining a structure of a compressor.

FIG. 1 is a cross-sectional view for explaining a structure of a compressor 100.

Hereinafter, a compressor according to an embodiment will be described with an example of a linear compressor in which a piston linearly reciprocates to suction and compress a fluid and discharge the compressed fluid.

The linear compressor may be a component of a refrigeration cycle, and the fluid compressed in the linear compressor may be a refrigerant circulating in the refrigeration cycle. In addition to the compressor, the refrigeration cycle includes a condenser, an expansion device, and an evaporator. Also, the linear compressor may be used as one component of a cooling system of a refrigerator, but is not limited thereto. For example, the linear compressor may be widely used throughout the industry.

Referring to FIG. 1, a compressor 100 includes a casing 110 and a main body accommodated in the casing 110, and the main body includes a frame 120, a cylinder 140 fixed to the frame 120, a piston 150 for linearly reciprocating inside the cylinder 140, and a driving unit 130 that is fixed to the frame 120 and provides driving force to the piston 150. Here, the cylinder 140 and the piston 150 may be referred to as compression units 140 and 150.

The compressor 100 may be provided with a bearing unit for reducing friction between the cylinder 140 and the piston 150. The bearing unit may be an oil bearing or a gas bearing. Alternatively, a mechanical bearing may be used as the bearing unit.

The main body of the compressor 100 may be elastically supported by support springs 116 and 117 installed at both inner ends of the casing 110. The support spring 116 and 117 may include a first support spring 116 supporting a rear side of the main body and a second support spring 117 supporting a front side of the main body and be provided as a plate spring. The support springs 116 and 117 may absorb vibrations and impacts generated by the reciprocating motion of the piston 150 while supporting components provided in the man body.

The casing 110 may define a sealed space, and the sealed space includes an accommodation space 101 in which the suctioned refrigerant is accommodated, a suction space 102 filled with the refrigerant before being compressed, a compression space 103 in which the refrigerant is compressed, and a discharge space 104 filled with the compressed refrigerant.

That is, the refrigerant suctioned from a suction tube 114 connected to a rear side of the casing 110 is filled in the accommodation space 101, and the refrigerant in the suction space 102 communicating with the accommodation space 101 is compressed in the compression space 103 and discharged to the discharge space 104. Then, the refrigerant is discharged to the outside through a discharge tube 115 connected to a front side of the casing 110.

The casing 110 may be constituted by a shell 111 having an elongated cylindrical shape in a substantially transverse direction with both ends opened, a first shell cover 112 coupled to a rear side of the shell 111, and a second shell cover 113 coupled to a front side of the shell 111. Here, the front side denotes a direction in which the compressed refrigerant is discharged to a left side of the drawing, and the rear side denotes a direction in which the refrigerant is introduced into a right side of the drawing. Also, the first shell cover 112 or the second shell cover 113 may be integrated with the shell 111.

The casing 110 may be made of a thermally conductive material. Thus, heat generated in the inner space of the casing 110 may be rapidly released to the outside.

The first shell cover 112 may be coupled to the shell 111 to seal the rear side of the shell 111, and a suction tube 114 may be inserted in a center of the first shell cover 112 so as to be coupled to the first shell cover 112.

A rear side of a compressor body may be elastically supported in a radial direction by the first shell cover 112 through the first support spring 116.

The first support spring 116 may be provided as a circular plate spring. The first support spring 116 may have an edge portion supported by a back cover 123 in the front direction through the support bracket **123*a* and an opened central portion supported by the first shell cover 112 in the rear direction through the suction guide 116*a*.**

The suction guide **116*a* is provided in a cylindrical shape in which a through-passage is provided. A central opening of the first support spring 116 may be coupled to a front-side outer circumferential surface of the suction guide 116*a*, a rear-side end of the suction guide 116*a* may be supported by the first shell cover 112. Here, a separate suction-side support member 116*b* may be disposed between the suction guide 116*a* and an inner surface of the first shell cover 112**.

A rear-side of the suction guide **116*a* may communicate with the suction tube 114. Thus, the refrigerant suctioned through the suction tube 114 may pass through the suction guide 116*a* and then be smoothly introduced into a muffler unit 160** to be described later.

A damping member **116*c* made a rubber material or the like may be installed between the suction guide 116*a* and the suction-side support member 116*b*. Thus, vibrations that may occur while the refrigerant is suctioned through the suction tube 114 may be prevented from being transmitted to the first shell cover 112**.

The second shell cover 113 may be coupled to the shell 111 to seal the front side of the shell 111, and the discharge tube 115 may be inserted and coupled through a loop pipe **115*a*. The refrigerant discharged from the compression space 103 may pass through a discharge cover assembly 180 and then be discharged into the refrigeration cycle through the loop pipe 115*a* and the discharge tube 115**.

The front side of the compressor body may be elastically supported in the radial direction by the shell 111 or the second shell cover 113 through the second support spring 117.

The second support spring 117 may be provided as a circular plate spring, and the opened central portion of the second support spring 117 may be supported by the discharge cover assembly 180 in a rear direction through a first support guide **117*b*, and the edge portion of the second support spring 117 may be supported by an inner surface of the shell 111 in the radial direction or an inner circumferential surface of the shell 11 adjacent to the second shell cover 113 through the support bracket 117***a*. Unlike the drawing, the edge portion of the second support spring 117 may be supported by the second shell cover 113 in the front direction through a bracket (not shown).

The first support guide 117*b* may have a continuous cylindrical shape having different diameters. Here, a front side of the first support guide 117*b* may be inserted into the central opening of the second support spring 117, and a rear side of the first support guide 117*b* may be inserted into the central opening of the discharge cover assembly 180. A support cover 117*c* may be coupled to the front side of the first support guide 117*b* with the second support spring 117 therebetween. Also, a cup-shaped second support guide 117*d* that is recessed forward may be coupled to the front side of the support cover 117*c*, and a cup-spaced third support guide 117*e* that is recessed backward to correspond to the second support guide 117*d* may be coupled to the inside of the second shell cover 113. The second support guide 117*d* may be inserted into the third support guide 117*e* so as to be supported in the axial direction and the radial direction. Here, a gap may be defined between the second support guide 117*d* and the third support guide 117*e*.

The frame 120 includes a body portion 121 supporting the outer circumferential surface of the cylinder 140 and a flange portion 122 connected to one side of the body portion 121 to support the driving unit 130. The frame 120 may be elastically supported together with the driving unit 130 and the cylinder 140 by the casing 110 through the first support spring 116 and the second support spring 117.

The body portion 121 may have a cylindrical shape surrounding the outer circumferential surface of the cylinder 140, and the flange portion 122 may extend from a front-side end of the body portion 121 in the radial direction.

The cylinder 140 may be coupled to an inner circumferential surface of the body portion 121, and an inner stator 134 may be coupled to an outer circumferential surface of the body portion 121. For example, the cylinder 140 may be fixed to be press-fitted to the inner circumferential surface of the body portion 121, and the inner stator 134 may be fixed using a fixing ring.

An outer stator 131 may be coupled to a rear surface of the flange portion 122, and the discharge cover assembly 180 may be coupled to a front surface of the flange portion 122. For example, the outer stator 131 and the discharge cover assembly 180 may be fixed to each other through a mechanical coupling unit.

A bearing inlet groove 125*a* constituting a portion of the gas bearing may be defined in one side of the front surface of the flange portion 122, and a bearing communication hole 125*b* passing from the bearing inlet groove 125*a* to the inner circumferential surface of the body portion 121 may be defined. A gas groove 125*c* communicating with the bearing communication hole 125*b* may be defined in the inner circumferential surface of the body portion 121.

The bearing inlet groove 125*a* may be recessed by a predetermined depth in the axial direction, and the bearing communication hole 125*b* may be provided as a hole having a cross-sectional area less than that of the bearing inlet groove 125*a* and be inclined toward the inner circumferential surface of the body portion 121. The gas groove 125*c* may has an annular shape with a predetermined depth and an axial length in the inner circumferential surface of the body portion 121. Alternatively, the gas groove 125*c* may be defined in the outer circumferential surface of the cylinder 140, which contacts the inner circumferential surface of the body portion 121, or may be defined in both the inner circumferential surface of the body portion 121 and the outer circumferential surface of the cylinder 140.

In addition, a gas inflow hole 142 corresponding to the gas groove 125*c* may be defined in the outer circumferential surface of the cylinder 140. The gas inflow hole 142 constitutes a portion of a nozzle portion in the gas bearing.

Each of the frame 120 and the cylinder 140 may be made of aluminum or an aluminum alloy.

The cylinder 140 may have a cylindrical shape of which both ends are opened, the piston 150 may be inserted through a rear end of the cylinder 140, and a front end of the cylinder 140 may be closed through the discharge valve assembly 170. The compression space 103 surrounded by the cylinder 140, a front end (a head portion 151) of the piston 150, and the discharge valve assembly 170 may be defined. The compression space 103 may increase in volume when the piston 150 moves backward, and the compression space 103 may decrease in volume when the piston 150 moves forward. That is, the refrigerant introduced into the compression space 103 may be compressed while the piston 150 moves forward and may be discharged through the discharge valve assembly 170.

A front end of the cylinder 140 may be bent outward to provide the flange portion 141. The flange portion 141 of the cylinder 140 may be coupled to the frame 120. For example, a flange groove corresponding to the flange portion 141 of the cylinder 140 may be defined in the front-side end of the frame 120, and the flange portion 141 of the cylinder 140 may be inserted into the flange groove and be coupled through the mechanical coupling member.

A gas bearing unit for gas lubrication between the cylinder 140 and the piston 150 by supplying a discharge gas into a gap between the outer circumferential surface of the piston 150 and the outer circumferential surface of the cylinder 140 may be provided. The discharge gas between the cylinder 140 and the piston 150 may provide levitation force to the piston 150 to reduce friction of the piston 150 against the cylinder 140.

For example, the gas inflow hole 142 communicating with the gas groove 125*c* defined in the inner circumferential surface of the body portion 121 to guide the compressed refrigerant, which is introduced into the gas groove 125*c* by passing through the cylinder 140 in the radial direction, to the gap between the inner circumferential surface of the cylinder 140 and the outer circumferential surface of the piston 150 may be defined in the cylinder 140. Alternatively, in consideration of convenience of processing, the gas groove 125*c* may be defined in the outer circumferential surface of the cylinder 140.

An inlet of the gas inflow hole 142 may be relatively wide, and an outlet of the gas inflow hole 142 may be provided as a fine hole to serve as a nozzle. A filter (not shown) may be additionally provided at the inlet of the gas inflow hole 142 to block an inflow of foreign substances. The filter may be a mesh filter made of metal or may be provided by winding a member such as a fine thread.

A plurality of gas inflow holes 142 may be independently defined. Alternatively, an inlet of the gas inflow hole 142 may be provided as an annular groove, and a plurality of outlets of the gas flow hole 142 may be defined along the annular groove at a predetermined interval.

Also, the gas inflow hole 142 may be defined only at the front side with respect to a middle of the axial direction of the cylinder 140 or may be defined at the rear side in consideration of drooping of the piston 150.

The piston 150 is inserted into a rear opening of the cylinder 140 and is provided to seal the rear side of the compression space 103.

The piston 150 includes a head portion 151 that divides the compression space 103 in a disk shape and a cylindrical guide portion 152 extending backward from an outer circumferential surface of the head portion 151. The head portion 151 is provided to be partially opened, the guide portion 152 is empty therein, and a front portion of the guide portion 152 is partially sealed by the head portion 151. However, a rear side of the guide portion 152 is connected to the muffler unit 160. The head portion 151 may be provided as a separate member coupled to the guide portion 152, or the head portion 151 and the guide portion 152 may be integrated with each other.

A suction port 154 is provided to pass through the head portion 151 of the piston 150. The suction port 154 is provided to communicate with the suction space 102 and the compression space 103 inside the piston 150. For example, the refrigerant introduced from the accommodation space 101 to the suction space 102 inside the piston 150 may pass through the suction port 154 to pass through the compression space 103 between the piston 150 and the cylinder 140.

The suction port 154 may extend in the axial direction of the piston 150. Alternatively, the suction port 154 may be provided to be inclined in the axial direction of the piston 150. For example, the suction port 154 may extend to be inclined in a direction away from a central axis toward the rear side of the piston 150.

The suction port 154 may have a circular cross-sectional area and a constant inner diameter. Alternatively, the suction port 154 may be provided as a long hole of which an opening extends in a radial direction of the head portion 151 or may be provided so that the inner diameter gradually increases toward the rear side.

The suction port 154 may be provided in plurality in one or more directions of a radial direction and a circumferential direction of the head unit 151.

Also, a suction valve 155 for selectively opening or closing the suction port 154 may be mounted on the head portion 151 of the piston 150 adjacent to the compression space 103. The suction valve 155 may operate by elastic deformation to open or close the suction port 154. That is, the suction valve 155 may be elastically deformed to open the suction port 154 by a pressure of the refrigerant flowing through the suction port 154 to flow to the compression space 103.

Also, the piston 150 is connected to a mover 135, and the mover 135 reciprocates in a front and rear direction according to the movement of the piston 150. The inner stator 134 and the cylinder 140 may be disposed between the mover 135 and the piston 150. The mover 135 and the piston 150 may be connected to each other by a magnet frame 136 provided by bypassing the cylinder 140 and the inner stator 134 backward.

The muffler unit 160 is coupled to the rear side of the piston 150 and is provided to attenuate noise generated during the process of suctioning the refrigerant into the piston 150. The refrigerant suctioned through the suction tube 114 flows into the suction space 102 inside the piston 150 through the muffler unit 160.

The muffler unit 160 includes a suction muffler 161 communicating with the accommodation space 101 of the casing 110 and an inner guide 162 connected to a front side of the suction muffler 161 to guide the refrigerant to the suction port 154.

The suction muffler 161 may be disposed behind the piston 150. Here, a rear-side opening of the suction muffler 161 may be disposed adjacent to the suction tube 114, and a front end of the suction muffler 161 may be coupled to the rear side of the piston 150. The suction muffler 161 has a flow passage provided in the axial direction and may guide the refrigerant in the accommodation space 101 to the suction space 102 inside the piston 150.

Here, a plurality of noise spaces divided by baffles may be defined inside the suction muffler 161. The suction muffler 161 may be provided by coupling two or more members to each other. For example, a second suction muffler may be press-fitted inside a first suction muffler to define the plurality of noise spaces. The suction muffler 161 may be made of a plastic material in consideration of weight or insulation.

The inner guide 162 may have a pipe shape of which one side communicates with the noise space of the suction muffler 161, and the other side is deeply inserted into the piston 150. The inner guide 162 may have a cylindrical shape of which both ends are provided with the same inner diameter. However, in some cases, an inner diameter of a front end, which is a discharge-side, may be greater than that of a rear end which is an opposite side of the front end.

The suction muffler 161 and the inner guide 162 may be provided in various shapes to control a pressure of the refrigerant passing through the muffler unit 160. The suction muffler 161 and the inner guide 162 may be integrated with each other.

The discharge valve assembly 170 may include a discharge valve 171 and a valve spring 172 provided at a front side of the discharge valve 171 to elastically support the discharge valve 171. The discharge valve assembly 170 may selectively discharge the refrigerant compressed in the compression space 103. Here, the compression space 103 may be understood as a space defined between the suction valve 155 and the discharge valve 171.

The discharge valve 171 may be disposed to be supported on a front surface of the cylinder 140 and may be mounted to selectively open or close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, while the discharge valve 171 is supported on the front surface of the cylinder 140, the compression space 103 may be maintained in the sealed state, and the discharge valve 171 may discharge the compressed refrigerant of the compression space 103 into the opened space in a state of being spaced apart from the front surface of the cylinder 140.

The valve spring 172 is provided between the discharge valve 171 and the discharge cover assembly 180 to provide elastic force in the axial direction. The valve spring 172 may be provided as a compression coil spring or may be provided as a plate spring in consideration of an occupied space or reliability.

When a pressure in the compression space 103 is greater than or equal to the discharge pressure, the valve spring 172 is deformed forward to open the discharge valve 171, and the refrigerant is discharged from the compression space 103 and then discharged into the first discharge space **103*a* of the discharge cover assembly 180. When the discharge of the refrigerant is completed, the valve spring 172 provides restoring force to the discharge valve 171 so that the discharge valve 171** is closed.

A process in which the refrigerant is introduced into the compression space 103 through the suction valve 155, and the refrigerant in the compression space 103 is discharged to the discharge space 104 through the discharge valve 171 will be described as follows.

In the process in which the piston 150 linearly reciprocates inside the cylinder 140, when the pressure in the compression space 103 is equal to or less than a predetermined suction pressure, the suction valve 155 is opened, and the refrigerant is suctioned into the compression space 103. On the other hand, when the pressure in the compression space 103 exceeds the predetermined suction pressure, the refrigerant in the compression space 103 is compressed in the state in which the suction valve 155 is closed.

On the other hand, when a pressure in the compression space 103 is greater than or equal to a predetermined discharge pressure, the valve spring 172 is deformed forward to open the discharge valve 171, and the refrigerant is discharged from the compression space 103 to the discharge space 104 of the discharge cover assembly 180. When the discharge of the refrigerant is completed, the valve spring 172 provides restoring force to the discharge valve 171, and the discharge valve 171 is closed to seal the front side of the compression space 103.

The discharge cover assembly 180 is installed in front of the compression space 103 to define the discharge space 104 in which the refrigerant discharged from the compression space 103 is accommodated and then is coupled to the front side of the frame 120 to allow noise of the refrigerant, which is generated while the refrigerant is discharged from the compression space 103 to being attenuated. The discharge cover assembly 180 may be coupled to the front side of the flange portion 122 of the frame 120 while accommodating the discharge valve assembly 170. For example, the discharge cover assembly 180 may be coupled to the flange portion 122 through the mechanical coupling member.

A gasket 165 for insulation and an O-ring for suppressing leakage of the refrigerant of the discharge space 104 may be provided between the discharge cover assembly 180 and the frame 120.

The discharge cover assembly 180 may be made of a thermally conductive material. Thus, when a high-temperature refrigerant is introduced into the discharge cover assembly 180, heat of the refrigerant may be transferred to the casing 110 through the discharge cover assembly 180 and then be released to the outside of the compressor.

The discharge cover assembly 180 may be provided as one discharge cover, or a plurality of discharge covers may be disposed to sequentially communicate with each other. When the plurality of discharge covers are provided, the discharge space 104 may include a plurality of space portions partitioned by each of the discharge covers. The plurality of space portions are arranged in the front-rear direction to communicate with each other.

For example, when three discharge covers are provided, the discharge space 104 may include a first discharge space **103*a* defined between a first discharge cover 181 coupled to a front-side of the frame 120 and the frame 120, a second discharge space 103*b* defined between a second discharge cover 182 communicating with the first discharge space 103*a* and coupled to a front-side of the first discharge cover 181 and the first discharge cover 181, and a third discharge space 103*c* defined between a third discharge cover 183 communicating with the second discharge space 103*b* and coupled to a front-side of the second discharge cover 182 and the second discharge cover 182**.

The first discharge space **103*a* may selectively communicate with the compression space 103 by the discharge valve 171, the second discharge space 103*b* may communicate with the first discharge space 103*a*, and the third discharge space 103*c* may communicate with the second discharge space 103*b*. Thus, the refrigerant discharged from the compression space 103 may sequentially pass through the first discharge space 103*a*, the second discharge space 103*b*, and the third discharge space 103*c* and thus be attenuated in discharge noise and then may be discharged to the outside of the casing 110 through the loop pipe and the discharge tube 115, which communicate with the third discharge cover 813**.

The driving unit 130 includes an outer stator 131 disposed between the shell 111 and the frame 120 to surround the body portion 121 of the frame 120, an inner stator 134 disposed between the outer stator 131 and the cylinder 140 to surround the cylinder 140, and a mover 135 disposed between the outer state 131 and the inner stator 134.

The outer stator 131 may be coupled to the rear side of the flange portion 122 of the frame 120, and the inner stator 134 may be coupled to the outer circumferential surface of the body portion 121 of the frame 120. The inner stator 134 may be spaced inward from the outer stator 131, and the mover 135 may be disposed in a space between the outer stator 131 and the inner stator 134.

A winding coil may be mounted on the outer stator 131, and the mover 135 may be provided with a permanent magnet. The permanent magnet may be provided as a single magnet having one pole or may be provided as a combination of a plurality of magnets having three poles.

The outer stator 131 includes a coil winding body 132 surrounding the axial direction in the circumferential direction and a stator core 133 stacked while surrounding the coil winding body 132. The coil winding body 132 may include a hollow bobbin **132*a* having a cylindrical shape and a coil 132*b* wound in the circumferential direction of the bobbin 132*a*. A cross-section of the coil 132*b* may have a circular or polygonal shape, and for example, may have a hexagonal shape. In the stator core 133**, a plurality of lamination sheets may be radially stacked, or a plurality of lamination blocks may be stacked along a circumferential direction.

A front-side of the outer stator 131 may be supported by the flange portion 122 of the frame 120, and a rear-side of the outer stator 131 may be supported by the stator cover 137. For example, the stator cover 137 may be provided in the form of a hollow disk, the outer stator 131 may be supported on a front surface of the stator cover 137, and a resonance spring 190 may be supported on a rear surface of the stator cover 137.

The inner stator 134 may be configured by stacking a plurality of laminations on the outer circumferential surface of the body portion 121 of the frame 120 in the circumferential direction.

One side of the mover 135 may be coupled to and supported by the magnet frame 136. The magnet frame 136 has a substantially cylindrical shape and is disposed to be inserted into a space between the outer stator 131 and the inner stator 134. The magnet frame 136 is coupled to the rear side of the piston 150 and is provided to move together with the piston 150.

For example, a rear end of the magnet frame 136 may be bent to extend inward in the radial direction to provide a coupling portion **136*a*, and the coupling portion 136*a* may be coupled to the flange portion 153 disposed behind the piston 150. The coupling portion 136*a*** of the magnet frame

136 and the flange portion 153 of the piston 150 may be coupled to each other through the mechanical coupling member.

Furthermore, the flange portion 161*a* disposed in front of the suction muffler 161 may be disposed between the flange portion 153 of the piston 150 and the coupling portion 136*a* of the magnet frame 136. Thus, the piston 150, the muffler unit 160, and the mover 135 may linearly reciprocate together in a state of being integrally coupled to each other.

When current is applied to the driving unit 130, a magnetic flux is generated in the winding coil, and electromagnetic force may be generated by an interaction between the magnetic flux generated in the winding coil of the outer stator 131 and the magnetic flux generated by a permanent magnet of the mover 135 may be generated to allow the mover 135 to move. While the axial reciprocation movement of the mover 135 is performed, the piston 150 connected to the magnet frame 136 may also reciprocate in the axial direction by being integrated with the mover 135.

The driving unit 130 and the compression units 140 and 150 may be supported in the axial direction by the support springs 116 and 117 and the resonance spring 190.

The resonance spring 118 may amplify the vibration implemented by the reciprocating motion of the mover 135 and the piston 150 to effectively compress the refrigerant. Particularly, the resonance spring 118 may be adjusted to a frequency corresponding to the natural frequency of the piston 150 so that the piston 150 performs a resonance motion. Also, the resonance spring 118 may cause a stable movement of the piston 150 to reduce the vibration and the noise generation.

The resonance spring 118 may be a coil spring extending in the axial direction. Both ends of the resonance spring 118 may be connected to a vibration body and a fixed body, respectively. For example, one end of the resonance spring 118 may be connected to the magnet frame 136, and the other end of the resonance spring 118 may be connected to the back cover 123. Thus, the resonance spring 118 may be elastically deformed between the vibration body vibrating at one end thereof and the fixed body fixed to the other end thereof.

The natural frequency of the resonance spring 118 is designed to match the resonance frequency of the mover 135 and the piston 150 when the compressor 100 operate so that the reciprocating motion of the piston 150 is amplified. However, since the back cover 123 provided as the fixed body is elastically supported to the casing 110 through the first support spring 116, the back cover 123 may not be strictly fixed.

The resonance spring 118 may include a first resonance spring 118*a* supported on a rear-side thereof and a second resonance spring 118*b* supported on a front side thereof with respect to the spring support 119.

The spring support 119 includes a body portion 119*a* surrounding the suction muffler 161, a coupling portion 119*b* bent from a front side of the body portion 119*a* in an inner radial direction, and a support portion 119*c* bent from a rear side of the body portion 119*a* in an outer radial direction.

A front surface of the coupling portion 119*b* of the spring support 119 may be supported by the coupling portion 136*a* of the magnet frame 136. An inner diameter of the coupling portion 119*b* of the spring support 119 may be provided to surround an outer diameter of the suction muffler 161. For example, the coupling portion 119*b* of the spring support 119, the coupling portion 136*a* of the magnet frame 136, and the flange portion 153 of the piston 150 may be sequentially disposed and then integrated with each other through the mechanical member. Here, as described above, the flange portion 161*a* of the suction muffler 161 may be disposed between the flange portion 153 of the piston 150 and the coupling portion 136*a* of the magnet frame 136 and thus may be fixed together.

The first resonance spring 118*a* may be provided between a front surface of the back cover 123 and a rear surface of the spring support 119, and the second resonance spring 118*b* may be provided between a rear surface of the stator cover 137 and a front surface of the spring support 119.

A plurality of first and second resonance springs 118*a* and 118*b* may be disposed in a circumferential direction of a central axis. Also, the first resonance spring 118*a* and the second resonance spring 118*b* may be disposed parallel to each other in the axial direction or may be disposed to be alternated with respect to each other. Also, the first and second springs 118*a* and 118*b* may be disposed at regular intervals in the radial direction of the central axis. For example, each of the first and second springs 118*a* and 118*b* may be provided in three and may be disposed at intervals of about 120 degrees in a radial direction of the central axis.

The compressor 100 may include a plurality of sealing members that are capable of increasing in coupling force between the frame 120 and components around the frame 120.

For example, the plurality of sealing members may include a first sealing member disposed into a portion at which the frame 120 and the discharge cover assembly 180 are coupled to each other and inserted into an installation groove defined in a front end of the frame 120 and a second sealing member provided at a portion at which the frame 120 and the cylinder 140 are coupled to each other and inserted into an installation groove defined in an outer surface of the cylinder 140. The second sealing member may prevent the refrigerant in the gas groove 125*c* defined between the inner circumferential surface of the frame 120 and the outer circumferential surface of the cylinder 140 from leaking to the outside and improve the coupling force between the frame 120 and the cylinder 140. The plurality of sealing members may further include a third sealing member provided at a portion at which the frame 120 and the inner stator 134 are coupled to each other and inserted into an installation groove defined in an outer surface of the frame 120. Here, each of the first to third sealing members may have a ring shape.

The operation of the linear compressor 100 described above is as follows.

First, when current is applied to the driving unit 130, a magnetic flux may be generated in the outer stator 131 by the current flowing through the coil 132*b*. The magnetic flux generated in the outer stator 131 may generate electromagnetic force, and the mover 135 provided with the permanent magnet may linearly reciprocate by the generated electromagnetic force. The electromagnetic force may be alternately generated in a direction (forward direction) in which the piston moves toward a top dead center (TDC) during a compression stroke and may be generated in a direction (backward direction) in which the piston moves toward a bottom dead center (BDC) during a suction stroke. That is, the driving unit 130 may generate propulsion force, which is force that pushes the mover 135 and the piston 150 in the moving direction.

The piston 150 linearly reciprocating inside the cylinder 140 may repeatedly increase and decrease in volume of the compression space 103.

When the piston 150 moves in a direction (backward direction) in which the volume of the compression space 103 increases, the pressure in the compression space 103 decreases. Here, the suction valve 155 mounted at the front side of the piston 150 may be opened, and the refrigerant remaining in the suction space 102 may be suctioned into the compression space 103 along the suction port 154. The suction stroke may proceed until the piston 150 maximizes the volume of the compression space 103 and is disposed at the bottom dead center.

The piston 150 reaching the bottom dead center may be converted in moving direction to perform the compression stroke while moving in the direction (forward direction) in which the volume of the compression space 103 decreases. During the compression stroke, the suctioned refrigerant is compressed while the pressure in the compression space 103 increases. When the pressure in the compression space 103 reaches a set pressure, the discharge valve 171 is pushed by the pressure in the compression space 103 and then is opened from the cylinder 140, and the refrigerant is discharged through the spaced space. The compression stroke continues while the piston 150 moves to the top dead center at which the volume of the compression space 103 is minimized.

As the suction stroke and the compression stroke of the piston 150 are repeated, the refrigerant introduced into the accommodation space 101 inside the compressor 100 through the suction tube 114 sequentially passes through the suction guide 116*a*, the suction muffler 161, and the inner guide 162 and is introduced into the suction space 102, and the refrigerant of the suction space 102 is introduced into the compression space 103 inside the cylinder during the suction stroke of the piston 150. After the refrigerant in the compression space 103 is compressed and discharged to the discharge space 104 during the compression stroke of the piston 150, the refrigerant may pass through the loop pipe 115*a* and the discharge tube 115 to flow to the outside of the compressor 100.

Figure 2:
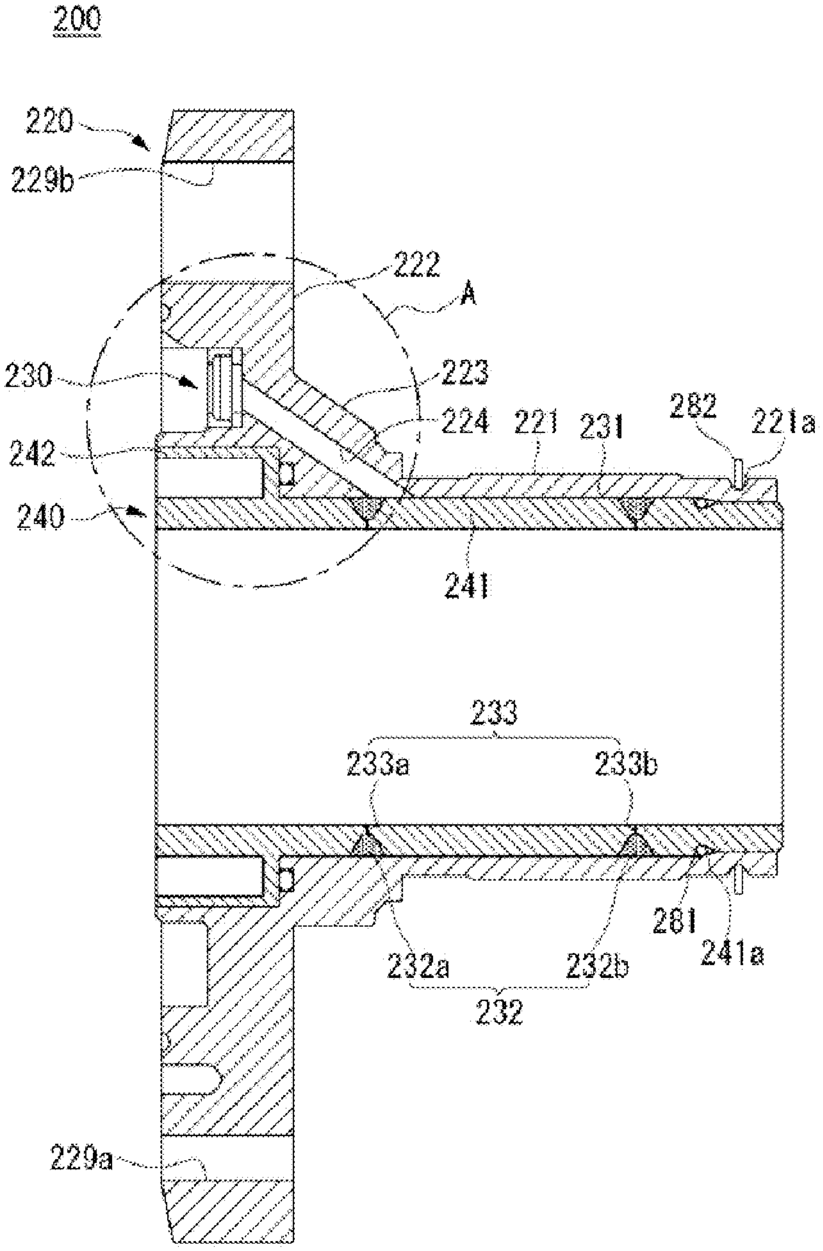
FIG. 2 is a cross-sectional view for explaining a coupling structure between a frame and a cylinder.
Figure 3:
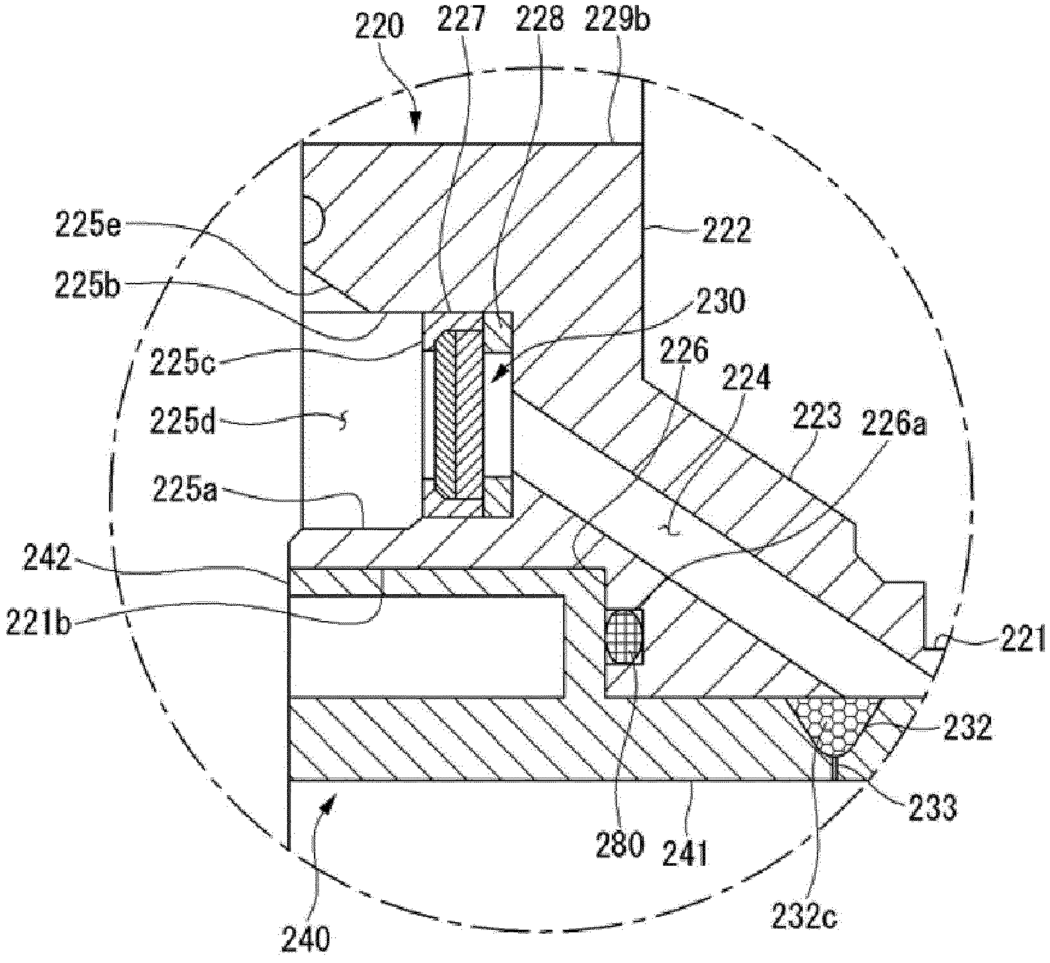
FIG. 3 is an enlarged cross-sectional view of a portion A of FIG. 2.

FIG. 2 is a cross-sectional view for explaining a coupling structure between the frame 220 and the cylinder 240, and FIG. 3 is an enlarged cross-sectional view of a portion A of FIG. 2.

Referring to FIGS. 2 and 3, the cylinder 240 according to this embodiment may be coupled to the frame 220. For example, the cylinder 240 may be disposed to be inserted into the frame 220.

The frame 220 includes a frame body 221 extending in the axial direction and a frame flange 222 extending outward from the frame body 221 in the radial direction.

That is, the frame flange 222 may extend from an outer circumferential surface of the frame body 221 at a first set angle. For example, the first set angle may be about 90 degrees.

The frame body 221 includes a main body accommodation portion having a cylindrical shape with a central axis in the axial direction and accommodating the cylinder body 241 therein.

Also, a third installation groove 221*a* into which a third sealing member 282 disposed between the frame body 221 and the inner stator 134 (see FIG. 1) is inserted may be defined in a rear portion of the frame body 111.

The frame flange 222 includes a first wall 225*a* having a ring shape and coupled to the cylinder flange 242, a second wall 225*b* having a ring shape and disposed to surround the first wall 225*a*, and a third wall 115*c* connecting a rear end of the first wall 225*a* to a rear end of the second wall 225*b*. Each of the first wall 225*a* and the second wall 225*b* may extend in the axial direction, and the third wall 225*c* may extend in the radial direction.

The frame space portion 225*d* may be defined by the first to third walls 225*a*, 225*b*, and 225*c*. The frame space portion 225*d* is recessed backward from a front end of the frame flange 222 to form a portion of the discharge passage through which the refrigerant discharged through the discharge valve 171 (see FIG. 1) flows.

A flange accommodation portion 221*b* into which at least a portion of the cylinder 240, for example, the cylinder flange 242 is inserted is defined in an inner space of the first wall 225*a*. For example, the flange accommodation portion 221*b* may have an inner diameter equal to or slightly less than an outer diameter of the cylinder flange 242.

When the cylinder 240 is press-fitted into the frame 220, the cylinder flange 242 may interfere with the first wall 225*a*. In this process, the cylinder flange 242 may be deformed.

The frame flange 222 further includes a sealing member seating portion 226 extending inward from a rear end of the first wall 225*a* in the radial direction. A first installation groove 226*a* into which the first sealing member 280 is inserted is defined in the sealing member seating portion 226. The first installation groove 226*a* may be recessed backward from the sealing member seating portion 226.

The frame flange 222 further includes a coupling grooves 229*a* to which a predetermined coupling member for coupling the frame 220 to peripheral portions is coupled. The coupling hole 229*a* may be provided in plurality along an outer circumference of the second wall 225*a*.

The frame flange 222 includes a terminal insertion portion 229*b* providing a lead-out path of a terminal portion of the driving unit (see 130 in FIG. 1). The terminal insertion portion 229*b* is provided so that the frame flange 222 is cut in the front and rear direction.

The terminal portion may extend forward from the coil 132*b* (see FIG. 1) and be inserted into the terminal insertion portion 229*b*. Due to this configuration, the terminal portion may be exposed to the outside from the driving unit 130 and the frame 220 so as to be connected to a cable.

The terminal insertion portion 229*c* may be provided in plurality. The plurality of terminal insertion portions 229*c* may be disposed along the outer circumference of the second wall 225*b*. Only one terminal insertion portion 229*c*, into which the terminal portion is inserted, of the plurality of terminal insertion portions 229*c* is provided. The rest terminal insertion portion 229*b* may be understood as components for preventing the frame 220 from being deformed.

For example, three terminal insertion portions 229*b* may be provided in the frame flange 222. Among them, the terminal portion may be inserted into one terminal insertion portion 229*b*, and the terminal portion may not be inserted into the remaining two terminal insertion portions 229*b*.

When the frame 220 is coupled to the stator cover 137 (see FIG. 1) or the discharge cover 180 (see FIG. 1) or press-fitted to be coupled to the cylinder 240, large stress may be applied to the frame 220. If when one terminal insertion portion 229*b* is provided in the frame flange 222, the stress may be concentrated to a specific point to cause deformation of the frame flange 222. Thus, in the current embodiment, the three terminal insertion portions 229*b* may be provided in the frame flange 222, i.e., uniformly disposed in the circumferential direction with respect to the central portion of the frame 220 in the axial direction to prevent the stress from being concentrated.

The frame 220 further includes a frame inclination portion 223 inclinedly extending from the frame flange 222 to the frame body 221. An outer surface of the frame inclination portion 223 may extend at a second preset angle with respect to the outer circumferential surface of the frame body 221, i.e., in the axial direction. For example, the second preset angle may be greater than about 0 degree and less than about 90 degrees.

A gas hole 224 for guiding the refrigerant discharged from the discharge valve 171 (see FIG. 1) to a gas inflow portion 232 of the cylinder 240 is defined in the frame extension portion 223. The gas hole 224 may pass through the inside of the frame inclination portion 223.

In detail, the gas hole 224 may extend from the frame flange 222 up to the frame body 221 via the frame inclination portion 223.

Since the gas hole 224 is defined by passing through a portion of the frame 220 having a relatively thick thickness up to the frame flange 222, the frame inclination portion 223, and the frame body 221, the frame 220 may be prevented from being reduced in strength due to the formation of the gas hole 224.

The extension direction of the gas hole 224 may correspond to the extension direction of the frame inclination portion 223 to form the second preset angle with respect to the inner circumferential surface of the frame body 221, i.e., in the axial direction.

A discharge filter 230 for filtering foreign substances from the refrigerant introduced into the gas hole 224 is disposed on an inlet of the gas hole 224. The discharge filter 230 may be installed on the third wall 225*c*.

In detail, the discharge filter 230 may be installed on a filter groove 227 defined in the frame flange 222. The filter groove 227 may be recessed backward from the third wall 225*c* and have a shape corresponding to that of the discharge filter 230.

That is, the inlet of the gas hole 224 may be connected to the filter groove 227, and the gas hole 224 may pass through the frame flange 222 and the frame inclination portion 223 from the filter groove 227 to extend to the inner circumferential surface of the frame body 221. Thus, an outlet of the gas hole 224 may communicate with an inner circumferential surface of the frame body 221.

Also, a guide groove 225*e* for easily processing the gas hole 224 may be defined in the frame flange 222. The guide groove 115*e* may be defined by recessing at least a portion of the second wall 115*b* and defined in an edge of the filter groove 227.

While the gas hole 224 is processed, a processing mechanism may perform a drilling process from the filter groove 227 to the frame inclination portion 223. Here, the processing mechanism may interfere with the second wall 225*b* to cause a limitation in which the drilling is not easy. Thus, in the current embodiment, the guide groove 225*e* may be defined in the second wall 225*b*, and the processing mechanism may be disposed in the guide groove 225*e* to facilitate the processing of the gas hole 224.

The linear compressor 10 further includes a filter sealing member 228 installed at a rear side, i.e., an outlet side of the discharge filter 230. The filter sealing member 228 may have an approximately ring shape. In detail, the filter sealing member 228 may be placed on the filter groove 227. When the discharge filter 230 presses the filter groove 227, the filter sealing member 228 may be press-fitted into the filter groove 227.

The frame inclination portion 223 may be provided in plurality along a circumference of the frame body 221. Only one frame inclination portion 223, in which the gas hole 224 is defined, of the plurality of frame inclination portions 223 is provided. The remaining frame inclination portions 223 may be understood as components for preventing the frame 220 from being deformed.

When the frame 220 is coupled to the stator cover 149 or the discharge cover 160 or press-fitted with respect to the cylinder 240, large stress may be applied to the frame 110. If when only one frame inclination portion 223 is provided in the frame 220, the stress may be concentrated to a specific point to cause deformation of the frame 220. Thus, in the current embodiment, the three frame inclination portions 223 may be provided outside the frame body 221, i.e., uniformly disposed in the circumferential direction around the central portion of the frame 220 to prevent the stress from being concentrated.

That is, the cylinder 240 may be coupled to the inside of the frame 220. For example, the cylinder 240 may be coupled to the frame 220 through a press-fitting process.

The cylinder 240 includes a cylinder body 241 extending in the axial direction and a cylinder flange 242 disposed outside a front portion of the cylinder body 241. The cylinder body 241 has a cylindrical shape with a central axis in the axial direction and is inserted into the frame body 221. Thus, an outer circumferential surface of the cylinder body 241 may be disposed to face an inner circumferential surface of the frame body 221.

A gas inflow portion 232 into which the gas refrigerant flowing through the gas hole 224 is introduced is provided in the cylinder body 241.

The linear compressor 200 further includes a gas pocket 231 disposed between the inner circumferential surface of the frame 220 and the outer circumferential surface of the cylinder 240 so that the gas for the lubricating function flows.

The refrigerant gas passage flowing from the outlet of the gas hole 224 to the gas inflow hole 232 defines at least a portion of the gas pocket 231. the gas inflow portion 232 may be disposed at an inlet side of a nozzle portion 233 that will be described later.

In detail, the gas inflow portion 232 may be recessed inward from the outer circumferential surface of the cylinder body 241 in the radial direction. The gas inflow portion 232 may have a circular shape along the outer circumferential surface of the cylinder body 241 with respect to the central axis in the axial direction.

The gas inflow portion 232 may be provided in plurality. For example, two gas inflow portions 232 may be provided. A first gas inflow portion 232*a* of the two gas inflow portions 232 is disposed on a front portion of the cylinder body 241, i.e., at a position that is close to the discharge valve 171 (see FIG. 1), and a second gas inflow portion 232*b* is disposed on a rear portion of the cylinder body 241, i.e., at a position that is close to a compressor suction side of the refrigerant. That is, the first gas inflow portion 232*a* may be disposed at a front side with respect to a central portion in a front and rear direction of the cylinder body 241, and the second gas inflow portion 232*b* may be disposed at a rear side.

The first nozzle portion 233*a* connected to the first gas inflow portion 232*a* may be disposed at a front side with respect to a central portion, and a second nozzle portion 233*b* connected to the second gas inflow portion 232*b* may be disposed at a rear side with respect to the central portion.

In detail, each of the first gas inflow portion 232*a* or the first nozzle portion 233*a* may be disposed at a position that is spaced a first distance from the front end of the cylinder body 241. Each of the second gas inflow portion 232*b* or the second nozzle portion 233*b* may be disposed at a position that is spaced a second distance from the front end of the cylinder body 241. The second distance may have a value greater than the first distance. A third distance from the front end to the central portion of the cylinder body 241 may be greater than the first distance and less than the second distance.

Also, a fourth distance from the central portion to the first gas inflow portion **232*a* or the first nozzle portion 233*a* may be determined as a value that is less than a fifth distance from the central portion to the second gas inflow portion 232*b* or the second nozzle portion 233*b***.

The first gas inflow portion **232*a* is disposed at a position that is adjacent to the outlet of the gas hole 224. That is to say, a distance from the outlet 114*b* of the gas hole 224 to the first gas inflow portion 232*a* may be less than that from the outlet to the second gas inflow portion 232*b*. For example, the outlet of the gas hole 224 and the first gas inflow hole portion 232*a*** may be disposed to partially overlap each other.

Since an inner pressure of the cylinder 240 is relatively high at a position that is close to the discharge side of the refrigerant, i.e., the inside of the first gas inflow portion **232*a*, the outlet of the gas hole 224 may be disposed adjacent to the first gas inflow portion 232*a*, and thus, a relatively large amount of refrigerant may be introduced into the cylinder 240 through the first gas inflow portion 232*a*. As a result, the function of the gas bearing is enhanced to prevent abrasion of the cylinder 240 and the piston 150 from occurring while the piston 150** reciprocates.

A cylinder filter member **232*c* may be installed on the gas inflow portion 232. The cylinder filter member 232*c* may prevent a foreign substance having a predetermined size or more from being introduced into the cylinder 240** and perform a function for absorbing oil components contained in the refrigerant. Here, the predetermined size may be about 1 μm.

The cylinder filter member **232*c* includes a thread that is wound around the gas inflow portion 232**. In detail, the thread may be made of a polyethylene terephthalate (PET) material and have a predetermined thickness or diameter.

The thickness or diameter of the thread may be may be determined to have adequate dimensions in consideration of the rigidity of the thread. If the thickness or diameter of the thread is too small, the thread may be easily broken due to very weak strength thereof. On the other hand, if the thickness or diameter of the thread is too large, a filtering effect with respect to the foreign substances may be deteriorated due to a very large pore in the gas inflow portion 232 when the thread is wound.

The cylinder body 241 further includes the nozzle portion 233 extending inward from the gas inflow portion 232 in the radial direction. The nozzle portion 233 may extend up to the inner circumferential surface of the cylinder body 241.

The radial length of the nozzle portion 233 may be less than the radial length of the gas inflow hole portion 232, that is, a recessed depth. An inner space of the nozzle portion 233 may have a volume less than that of the gas inflow portion 232.

In detail, the recessed depth and width of the gas inflow portion 232 and the length of nozzle portion 233 may be determined to have adequate dimensions in consideration of the rigidity of the cylinder 240, the amount of cylinder filter member **232*c*, or the intensity in pressure drop of the refrigerant passing through nozzle portion 233**.

For example, if the recessed depth and width of the gas inflow portion 232 are very large, or the length of the nozzle portion 233 is very short, the rigidity of the cylinder 240 may be weak. On the other hand, if the recessed depth and width of each of the gas inflow portion 232 are very small, an amount of cylinder filter member **232*c* installed on the gas inflow portion 232 may be very small. Also, the length of the nozzle portion 233 is too long, the pressure drop of the refrigerant passing through the nozzle portion 233** may be too large, it may be difficult to perform the function as the gas bearing.

In the current embodiment, a ratio of the length of the nozzle portion 233 to the length of the gas inflow portion 232 may be proposed to a range of about 0.65 to about 0.75. The effect of the gas bearing may be improved within the above-described ratio range, and the rigidity of the cylinder 240 may be maintained to a desired level.

Also, the inlet of the nozzle portion 233 may have a diameter greater than that of the outlet thereof. In the flow direction of the refrigerant, a flow cross-sectional area of the nozzle portion 233 may gradually decrease from the inlet to the outlet. Here, the inlet may be understood as a portion connected to the gas inflow portion 232 to introduce the refrigerant into the nozzle portion 233, and the outlet may be understood as a portion connected to the inner circumferential surface of the cylinder 240 to supply the refrigerant to the outer circumferential surface of the piston 150.

In detail, if the diameter of the nozzle portion 233 is too small, an amount of refrigerant, which is introduced from the nozzle portion 233, of the high-pressure gas refrigerant discharged through the discharge valve 171 may be too large to increase flow losses in the compressor. On the other hand, if the diameter of the nozzle portion 233 is too small, the pressure drop in the nozzle portion 233 may increase to reduce the performance as a gas bearing.

Thus, in the current embodiment, the inlet of nozzle portion 233 may have a relatively large diameter to reduce the pressure drop of the refrigerant introduced into nozzle portion 233. In addition, the outlet **123*b* may have a relatively small diameter to control an inflow amount of gas bearing through nozzle portion 233** to a predetermined value or less.

For example, in the current embodiment, a ratio of the diameter of the inlet to the diameter of the outlet of the nozzle portion 233 may be determined as a value of about 4 to about 5. The effect of the gas bearing may be expected within the above-described range.

The nozzle portion 233 includes a first nozzle portion **233*a* extending from the first gas inflow portion 232*a* to the inner circumferential surface of the cylinder body 241 and a second nozzle portion 241*b* extending from the second gas inflow portion 232*b* to the inner circumferential surface of the cylinder body 241**.

The refrigerant that is filtered by the cylinder filter member **232*c* while passing through the first gas inflow portion 232*a* is introduced into a space between the inner circumferential surface of the first cylinder body 241 and the outer circumferential surface of the piston body 150 through the first nozzle portion 233*a*. Also, the refrigerant that is filtered by the cylinder filter member 232*c* while passing through the second gas inflow portion 232*b* is introduced into a space between the inner circumferential surface of the first cylinder body 241 and the outer circumferential surface of the piston body 150 through the second nozzle portion 233*b***.

The gas refrigerant flowing to the outer circumferential surface of the piston body 150 through the first and second nozzle portions **233*a* and 233*b* may provide levitation force to the piston 150 to perform a function as the gas bearing with respect to the piston 150**.

Since the first sealing member 280 seals the space on the front side of the gas pocket 231, the refrigerant flowing through the gas pocket 231 may be prevented from leaking to the front side of the frame 220 and the cylinder 240. Since the second sealing member 281 seals the rear-side space of the gas pocket 231, the refrigerant flowing through the gas pocket 231 may be prevented from leaking the rear side of the frame 220 and the cylinder 240. Thus, performance of the gas bearing may be improved.

A second installation groove 241*a* into which a third sealing member 282 disposed between the frame body 241 and the second installation groove 241*a* may be defined at a rear side of the cylinder body 241.

In the case of this embodiment, the gas bearing may be used as described above. The gas bearing for gas lubrication between the cylinder 240 and the piston 150 by supplying a discharge gas into a gap between the inner circumferential surface of the piston 150 and the outer circumferential surface of the cylinder 240 may be provided. The discharge gas between the cylinder 240 and the piston 150 may provide levitation force to the piston 150 to reduce friction of the piston 150 against the cylinder 240.

Hereinafter, a space between the cylinder 240 and the piston 150, that is, a space filled with the discharge gas supplied to provide levitation force will be referred to as a sliding portion.

Figure 4:
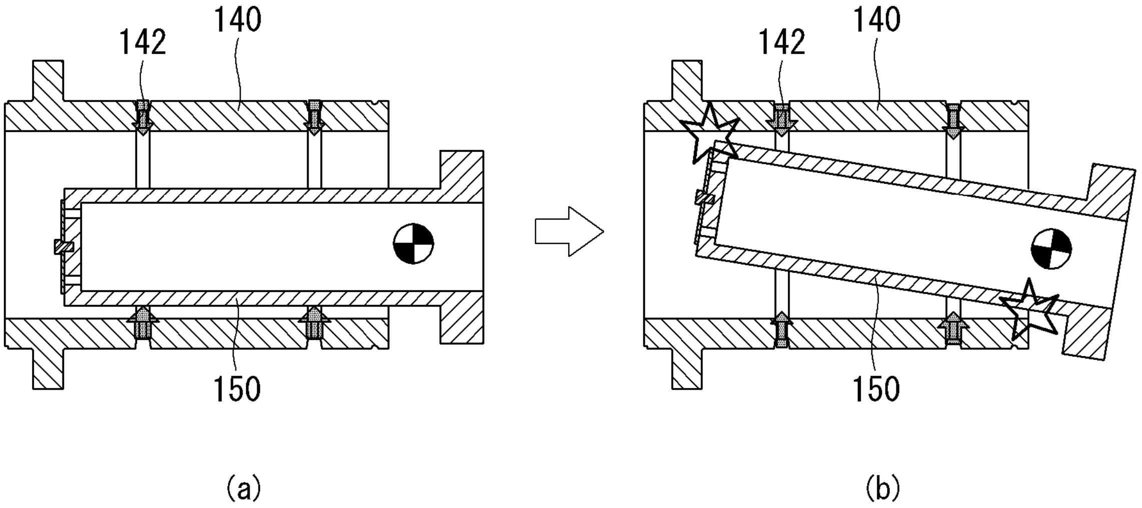
FIG. 4 is a view illustrating a state in which a piston is eccentric to contact the cylinder.

FIG. 4 is a view illustrating a state in which the piston is eccentric to contact the cylinder.

Referring to FIG. 4(*a*), eccentricity may occur in the cylinder 140 due to a self-weight of the piston 150. Here, a pressure of the refrigerant injected from the gas inflow hole 142 generates restoring force. That is, since a pressure at the place at which a distance between the piston 150 and the cylinder 140 is small is greater than the pressure at the place at which a distance between the piston 150 and the cylinder 140 is large, the piston 150 may move to a central position by the pressure of the refrigerant injected from the gas inflow hole 142.

However, since a center of mass of the piston 150 is disposed at the rear side, the front portion of the piston 150, which is far from the center of mass of the piston 150, generates moment due to the pressure of the gas inflow hole 142, and levitation force at the rear of the piston 150, which is close to the center of mass of the piston 150, is reduced. Referring to FIG. 4(*b*), a pressure is applied to the front side of the piston 150 to cause axial twisting in a clockwise direction, and an upper portion of the front side of the piston 150 may collide with the inner wall of the cylinder 140, or a lower portion of the rear side of the piston 150 may collide with the inner wall of the cylinder 140.

Figure 5:
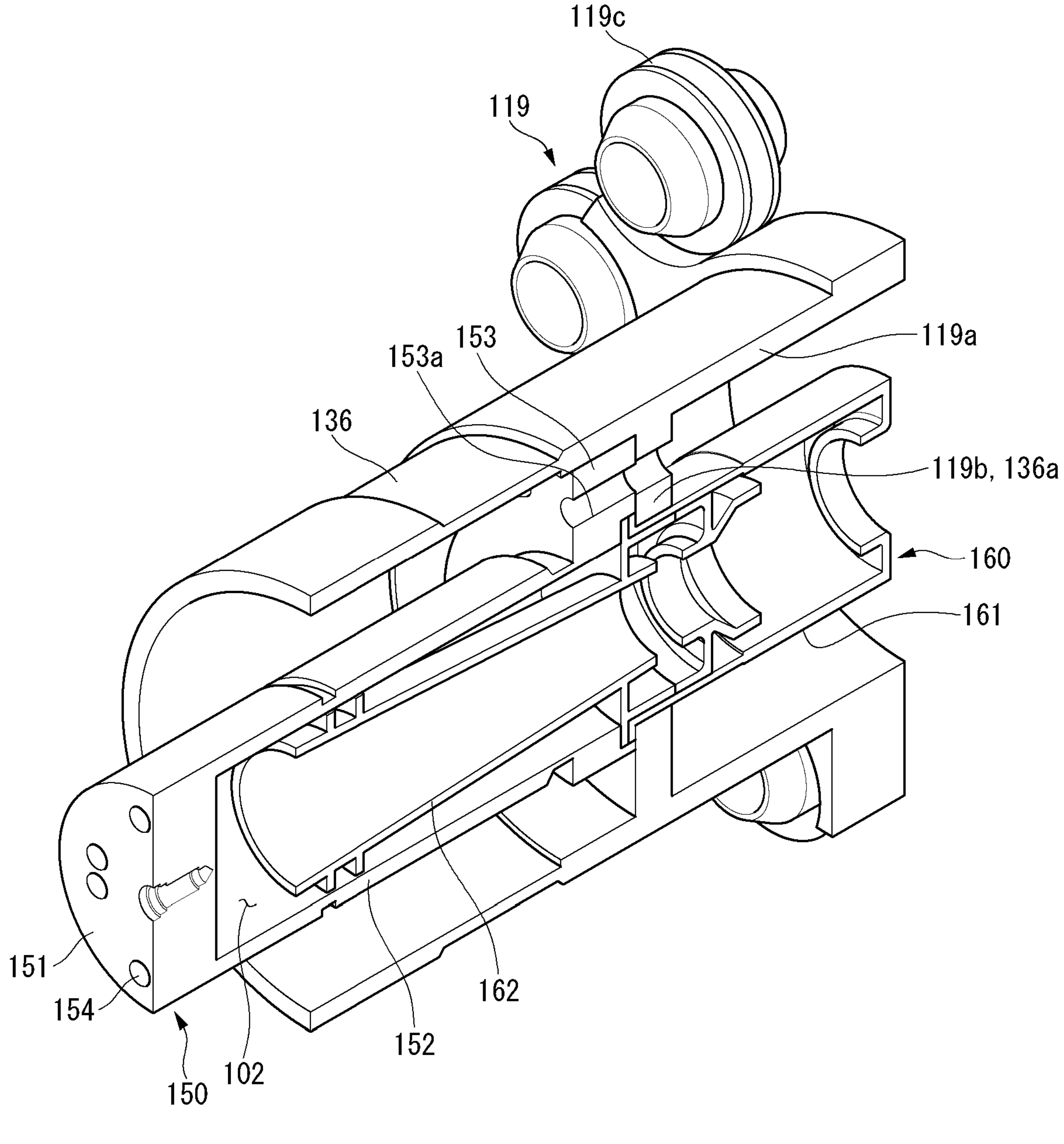
FIG. 5 is a perspective view illustrating a cross-section of a driver of a compressor according to a comparative embodiment.

FIG. 5 is a perspective view illustrating a cross-section of a driver of a compressor according to a comparative embodiment.

The piston 150 includes a head portion 151 disposed at the front side to partition the compression space 103 (see FIG. 1), a cylindrical guide portion 152 extending backward from an outer circumferential surface of the head portion 151, and a flange portion 153 extending radially outward from a rear side of the guide portion 152.

A suction port 154 is provided to pass through the head portion 151 of the piston 150. The suction port 154 is provided to communicate with the suction space 102 and the compression space 103 inside the piston 150.

The piston 150 may be fixed to the compressor structure by the flange portion 153.

The flange portion 153 of the piston 150 is coupled to the support portion 119*c* of the spring support 119 and corresponds to a coupling hole defined in the support portion 119*c*, and defines a coupling hole 153*a* into which a coupling member is inserted. Alternatively, the flange portion 153 of the piston 150 may be coupled to the magnet frame 136 and may be coupled to the coupling portion 136*a* (see FIG. 1) of the magnet frame 136 through the coupling member. The spring support 119 and the magnet frame 136 may be provided as separate members and be coupled to each other or be integrated with each other.

Since the piston 150 according to this comparative embodiment is directly mechanically coupled to the magnet frame 136 or the spring support 119, there is no movability in a direction that is away from the axial direction when moving in the front and rear direction. Therefore, when an error occurs in the alignment of the piston 150, contact between the piston 150 and the cylinder 140 occurs. This has been described in detail in FIG. 4.

Figure 6:
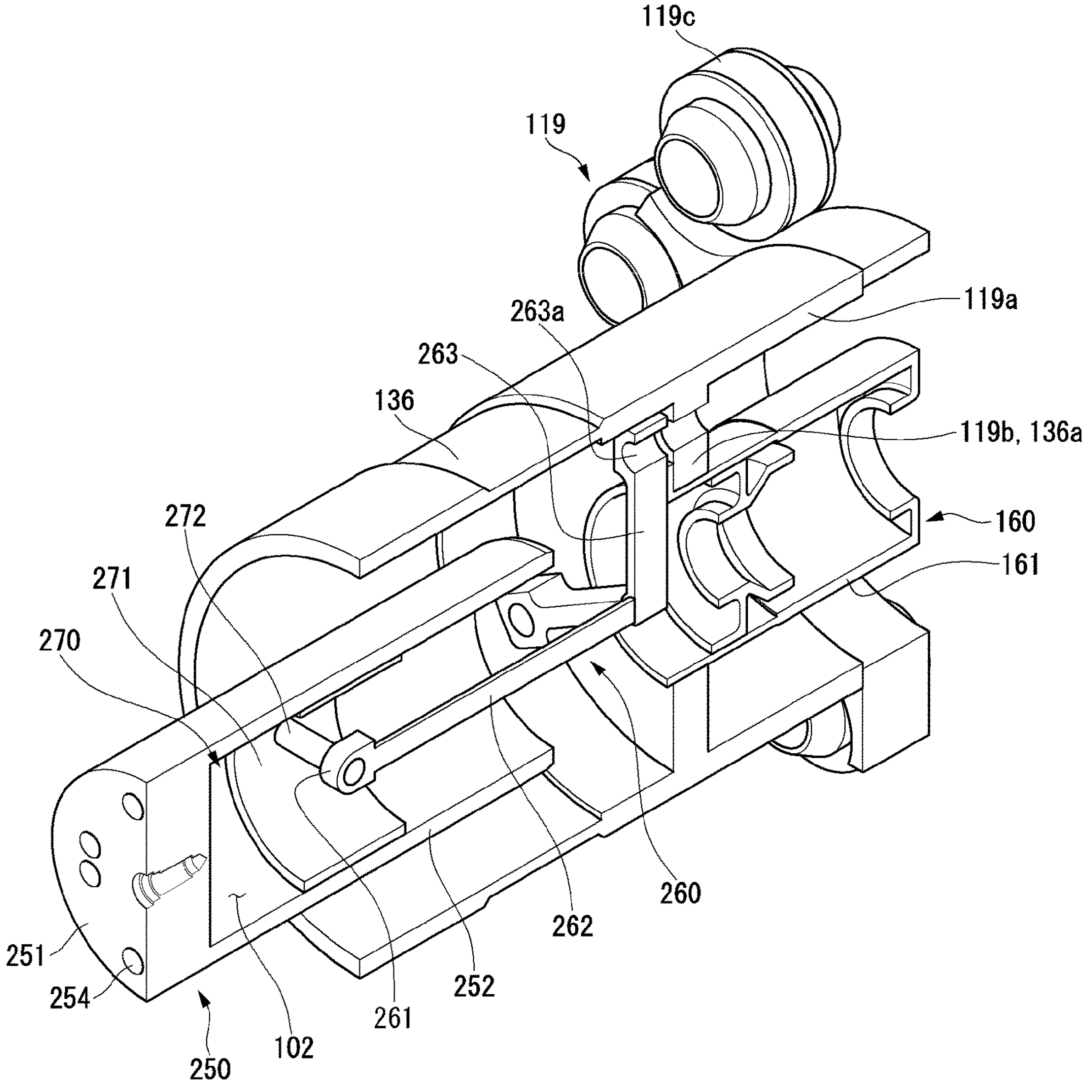
FIG. 6 is a perspective view illustrating a cross-section of a driver of a compressor according to a first embodiment.

FIG. 6 is a perspective view illustrating a cross-section of a driver of a compressor according to a first embodiment.

A driver of a compressor according to a first embodiment includes a piston 150 reciprocating the inside of the cylinder 140 (see FIG. 1) in an axial direction and a driver frame supporting the driver that drives the piston 150.

Here, the driver may include a mover 135 (see FIG. 1) connected to the piston 150 to allow the piston 150 to move in the axial direction. The driver frame may include a magnet frame 136 (see FIG. 1) that moves together with the mover 135 to support the mover 135.

Also, the mover 135 and the piston 150 may be connected to each other by the magnet frame 136 provided by bypassing the cylinder 140 and an inner stator 134 (see FIG. 1) backward.

That is, the magnet frame 136 may be disposed so that the cylinder 140 is disposed between the piston 150 and the piston 150.

Also, the driver frame may further include a spring support 119 connected to the magnet frame 136.

The spring support 119 may include a support portion 119*c* extending radially inward. The piston 150 may be coupled to the support portion 119*c*.

The spring support 119 may be disposed at a rear side of the magnet frame 136 in the axial direction so as to be connected to the magnet frame 136. That is, the magnet frame 136, the spring support 119, and the piston 150 may move together in the axial direction by the movement of the mover 135.

Also, a gas bearing for supplying a discharge gas to a space between the piston 150 and the cylinder 140 may be further provided. The gas bearing may include a gas inflow hole 142 defined to pass from an outer circumferential surface toward an inner circumferential surface of the cylinder 140.

The piston 150 includes a head portion 251 disposed at a front side to partition a compression space 103 (see FIG. 1) and a cylindrical guide portion 252 extending backward from an outer circumferential surface of the head portion 251.

The guide portion 252 has a suction space 102 opened backward and filled with a refrigerant introduced from a muffler unit 160.

A suction port 254 is provided to pass through the head portion 251. The suction port 254 is provided to communicate with the suction space 102 inside the guide portion 252 and the compression space 103 in front of the head portion 251.

Figure 7:
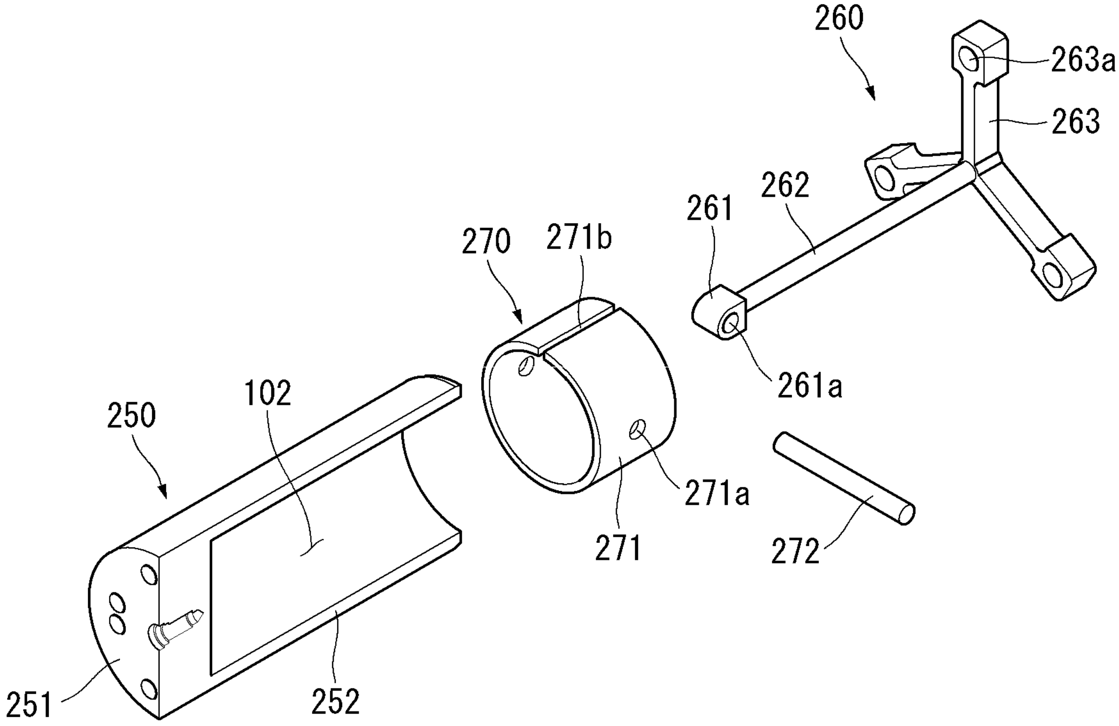
FIG. 7 is an exploded perspective view of a piston structure according to the first embodiment.

FIG. 7 is an exploded perspective view of a piston structure according to the first embodiment.

Referring to FIG. 7, a piston structure may include a guide member 250 that reciprocates inside the cylinder 140 and a mount member 260 that couples the guide member 250 to the driver frame.

The guide member 250 may be coupled to be relatively rotatable with respect to the mount member 260. That is, the guide member 250 may be relatively rotatable while being connected to the driver frame by the mount member 260.

Here, the rotation may include tilting that rotates about a rotational axis in a radial direction and rotation that rotates about a rotational axis in a direction of a driving shaft.

The piston structure may further include a rotational coupling member 270 rotatably coupling the guide member 250 to the mount member 260.

Referring to FIG. 6, the rotational coupling member 270 may include a support portion 271 supported inside the guide member 250 and a shaft member 272 coupled to the support portion 271.

The support portion 271 may be provided in a band shape or a partial band shape coupled to the inner circumferential surface of the guide member 250. The support portion 271 may be provided in a shape corresponding to the inner circumferential surface of the guide member 250.

The support portion 271 may be provided to be restricted in movement in a direction of a central axis inside of the guide member 250.

For example, the support portion 271 may be press-fitted into a hold having an inner diameter of the guide member 250 or may be fixed through a separate coupling member.

The support portion 271 may have a band shape of which one side is cut. In detail, a cutoff portion 271*b* that is cut in the axial direction may be defined in the support portion 271, and the support portion 271 may be elastically deformable by the cutoff portion 271*b*.

In other words, as both ends of the support portions 271, which are disposed to face each other, are disposed to be spaced apart from each other, the cutoff portion 271*b* may be defined.

Thus, in a state in which both the ends of the support portion 271, which defines the cutoff portion 271*b*, are deformed to be adjacent to each other, the support portion 271 may be inserted into the guide member 250. When both the ends of the support portion 271 are deformed to be adjacent through the cutoff portion 271*b*, the support portion 271 may have a diameter less than an inner diameter of the guide member 250. Thus, the support portion 271 may be easily inserted into the interior into the guide member 250.

When the support portion 271 is disposed at a designated position, the support portion 271 disposed at both the sides of the cutoff portion 271*b* may be restored to its original shape so that the diameter of the support portion 271 is the same as the inner diameter of the guide member 250. Here, when the diameter of the support portion 271 in the restored state is larger than the inner diameter of the guide member 250, the support portion 271 may be press-fitted into the guide member 250 and thus firmly fixed to the guide member 250.

Alternatively, the support portion 271 may be provided to be rotatable inside the guide member 250. When the diameter of the support portion 271 is less than the inner diameter of the guide member 250, the support portion 271 may rotate in a circumferential direction along the inner circumferential surface of the guide member 250 within the guide member 250. However, in this case, a separate stopper (not shown) capable of restricting the movement of the support portion 271 in the central axis direction may be additionally required.

The shaft member 272 may be disposed to cross a driving shaft of the piston structure. In detail, the shaft member 272 may extend in a direction perpendicular to the drive shaft while passing through the drive shaft.

The shaft member 272 may be coupled to the support portion 271. Particularly, at least a portion of the shaft member 272 may be inserted into and coupled to the support portion 271.

For example, an insertion hole 271*a* into which one end of the shaft member 272 is inserted may be defined in the support portion 271. Also, to more firmly support the shaft member 272, the support portion 271 may have a plurality of insertion holes 271*a* into which both ends of the shaft member 272 are inserted.

Here, the plurality of insertion holes 271*a* may be defined to face each other, and a virtual straight line connecting the plurality of insertion holes 271*a* to each other may be provided to cross the central axis of the support portion 271.

The shaft member 272 may be disposed to pass through a center of mass of the guide member 250. Thus, moment of the front guide member 250 and moment of the rear guide member 250 may be the same with respect to the shaft member 272.

Also, the center of mass of the guide member 250 may be defined inside the cylinder body 241.

A length of the shaft member 272 may be less than the inner diameter of the guide member 250 or the outer diameter of the support portion 271 in a state of being inserted into the guide member 250.

That is, even if the shaft member 272 is coupled to the support portion 271, an end of the shaft member 272 may be prevented from protruding from the outer circumferential surface of the support portion 271. Furthermore, the end of the shaft member 272 may be prevented from contacting or interfering with the inner circumferential surface of the guide member 250.

The mount member 260 may include a mount extension portion 262 extending in the central axis direction, a joint portion 261 connected to a front side of the mount extension portion 262, and a mount coupling portion 263 connected to a rear side of the mount extension portion 262 and coupled to the driver frame.

The mount extension portion 262 may have a bar shape extending in the central axis direction.

One side of the mount extension portion 262 to which the joint portion 261 is connected may be accommodated in the guide member 250, and the other side of the mount extension portion 262 to which the mount coupling portion 263 is connected may be disposed outside the rear of the guide member 250.

An end of the mount extension portion 262 disposed on the other side of the mount extension portion 262 may be disposed behind a rear end of the guide member 250. That is, a point at which the mount coupling portion 263 and the mount extension portion 262 are connected to each other may be spaced apart from the guide member 250 in the axial direction.

The joint portion 261 may be coupled to the shaft member 272 so as to be rotatable with respect to the shaft member 272.

The joint portion 261 may be connected to a front end of the mount extension portion 262.

The joint portion 261 may include a through-hole 261*a* through which the shaft member 272 of the rotational coupling member 270 is inserted.

Here, an extension direction of the through-hole 261*a* may be perpendicular to the extending direction of the mount extension portion 262. That is, the direction in which the shaft member 272 is inserted into the through-hole 261*a* may be perpendicular to the axial direction that is the extension direction of the mount extension portion 262.

The mount coupling portion 263 may include a plurality of flanges extending in the radial direction from the rear end of the mount extension portion 262. For example, the mount coupling portion 263 may have three flanges extending at intervals of about 120 degrees.

A coupling hole 263*a* disposed outside the flange in the radial direction may be defined in the mount coupling portion 263.

The mount coupling portion 263 may be coupled to the driver frame. In detail, the mount coupling portion 263 may be coupled to the spring support 119 or the magnet frame 136.

For example, the coupling hole 263*a* of the mount member 260 may be defined to correspond to the coupling hole defined in the support portion 119*c* of the spring support 119, and a separate coupling member (not shown) may pass through the coupling holes.

In this embodiment, the magnet frame 136 may be integrated with the spring support 119, and the magnet frame 136 may be understood as a concept including the spring support 119. Also, it is natural that the meaning that the mount member 260 is coupled to the spring support 119 may be interpreted as being connected to the magnet frame 136.

Due to the structure of the plurality of flanges, a refrigerant introduced from the muffler unit 160 may pass through a space between the plurality of flanges of the mount coupling portion 263.

Figure 8:
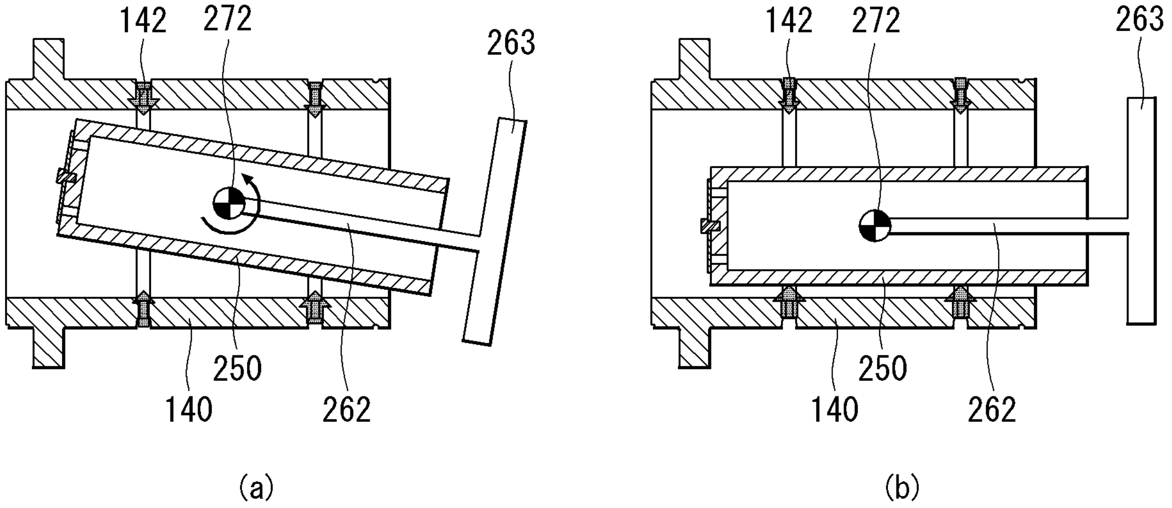
FIG. 8 is a view when inclination or eccentricity occurs in the piston structure according to the first embodiment.

FIG. 8 is a view when inclination or eccentricity occurs in the piston structure according to the first embodiment.

Referring to (a) of FIG. 8, the guide member 250 may be tilted to rotate in a clockwise or counterclockwise direction independently of the mount member 260.

Here, the clockwise or counterclockwise direction may be understood as a direction in which the central axis of the guide member 250 crosses the central axis of the cylinder 140.

The piston 250 may receive external force in a direction that is out of the direction of the driving shaft during the reciprocating movement within the cylinder 140. This acts as moment on the piston 250 to cause inclination. In the case of the piston 150 (see FIG. 4) according to the related art, as illustrated in (b) of FIG. 4, the inclination occurs in the integrated piston structure, and thus, the cylinder 140 and the piston 150 contact or collide with each other.

However, in the piston structure according to the first embodiment, the mount member 260 supporting the piston 250 and the guide member 250 in the cylinder 140 may be rotatably coupled to each other to prevent the cylinder 140 and the piston 250 from contacting each other.

When the inclination occurs in the guide member 250 of the piston structure, a pressure of a refrigerant discharged from the gas inflow hole 142 (refrigerant pressure of the gas bearing) is relatively large at a place at which a gap between the cylinder 140 and the guide member 250 decreases, and the pressure of the refrigerant discharged from the gas inflow hole 142 (refrigerant pressure of the gas bearing) is relatively small at a place at which the gap between the cylinder 140 and the guide member 250 increases.

Thus, even when the moment occurs in the piston structure, the guide member 250 may automatically adjust its position in the direction of the driver shaft in the cylinder 140 while rotating to be tilted according to the refrigerant pressure of the gas bearing.

Referring to (b) of FIG. 8, since the center of gravity of the guide member 250 is defined at the shaft member 272, moment due to eccentricity does not occur.

As illustrated in FIG. 4, in the case of the piston 150 according to the related art, when the center of gravity of the piston structure is defined at the rear side, and thus, the piston 150 is eccentric, the moment due to the refrigerant pressure of the gas bearing may be generated to cause the contact between the cylinder 140 and the piston 150.

However, in the piston structure according to the first embodiment, since the guide member 250 and the shaft member 272 of the mount member 260 are defined at the center of gravity of the guide member 250, even when the eccentricity occurs in the piston structure, the refrigerant pressure of the gas bearing acting on the front side of the member 250 and the refrigerant pressure of the gas bearing acting on the rear side of the guide member 250 are the same. Therefore, since moment due to the eccentricity of the piston structure does not occur, the contact or collision between the piston 250 and the cylinder 140 may be prevented.

Figure 9:
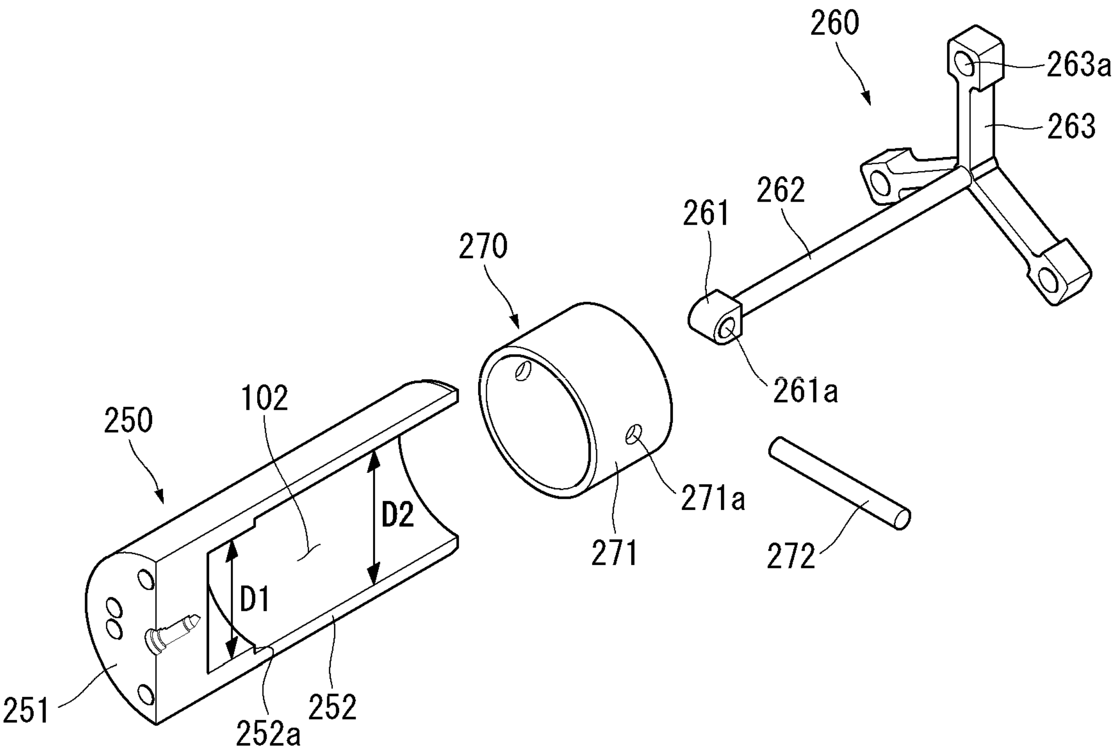
FIG. 9 is a view illustrating a modified example of the piston structure according to the first embodiment.

FIG. 9 is a view illustrating a modified example of the piston structure according to the first embodiment.

Referring to FIG. 9, the support portion 271 of the rotational coupling member 270 may have a band shape coupled to the inner circumferential surface of the guide member 250.

A stepped portion 252*a* may be disposed at a position corresponding to the coupling position of the support portion 271 of the rotational coupling member 270 on the inner circumferential surface of the guide member 250.

Particularly, the inner circumferential surface of the guide member 250 may include a first portion disposed in the front and having a first inner diameter D1 and a second portion disposed behind the first portion and having a second inner diameter D2. The stepped portion 252*a* may be provided at a connection point between the first portion and the second portion by a difference between the first inner diameter D1 and the second inner diameter D2.

The first inner diameter D1 may be less than the second inner diameter D2. Here, the second inner diameter D2 may be a size corresponding to the outer diameter of the support portion 271 of the rotational coupling member 270.

That is, since the first inner diameter D1 is less than the outer diameter of the support portion 271 of the rotational coupling member 270, the support portion 271 of the rotational coupling member 270 is hooked with the stepped portion 252*a* between the first inner diameter D1 and the second inner diameter D2 so as to be restricted in forward movement. Thus, the stepped portion 252*a* between the first inner diameter D1 and the second inner diameter D2 may function as a "front restriction stopper" of the guide member 250.

Alternatively, the support portion 271 of the rotational coupling member 270 may be press-fitted to be coupled to the guide member 250 so as to be restricted in backward movement. Alternatively, a separate coupling ring (not shown) may be coupled to the rear side of the support portion 271 to restrict the backward movement.

Here, the coupling position of the support portion 271 may be a position corresponding to the center of gravity of the guide member 250. In detail, the coupling position of the support portion 271 may be understood as a position at which the center of gravity of the guide member 250 is disposed between the front end and the rear end of the support portion 271.

Figure 10:
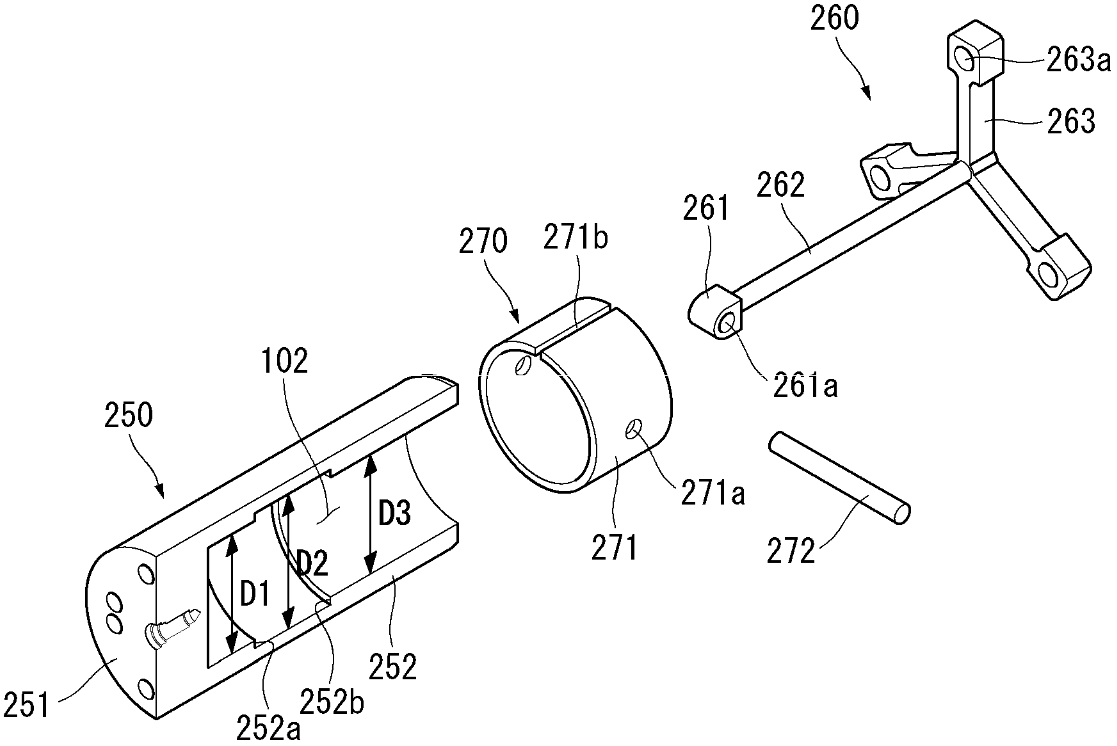
FIG. 10 is a view illustrating another modified example of the piston structure according to the first embodiment.

FIG. 10 is a view illustrating another modified example of the piston structure according to the first embodiment.

Referring to FIG. 10, the support portion 271 of the rotational coupling member 270 may have a partial band shape that is coupled to the inner circumferential surface of the guide member 250 and in which the cutoff portion 271*b* is defined.

A front stepped portion 252*a* and a rear stepped portion 252*b* may be provided on the inner circumferential surface of the guide member 250 to define the coupling position of the support portion 271 of the rotational coupling member 270.

The front stepped portion 252*a* may be provided at a position corresponding to the coupling position of the front end of the support portion 271 among the coupling positions of the support portion 271, and the rear stepped portion 252*b* may be provided at a position corresponding to the coupling position of the rear end of the support portion 271 among the coupling positions of the support portion 271.

Particularly, the front stepped portion 252*a* provided at a point at which the inner diameter of the guide member 250 increases from the first inner diameter D1 to the second inner diameter D2 may be disposed on the inner circumferential surface of the guide member 250. Here, the second inner diameter D2 may be a size corresponding to the outer diameter of the support portion 271 of the rotational coupling member 270.

That is, since the first inner diameter D1 is less than the outer diameter of the support portion 271 of the rotational coupling member 270, the support portion 271 of the rotational coupling member 270 is hooked with the front stepped portion 252*a* so as to be restricted in forward movement. Therefore, the front stepped portion 252*a* disposed between the portion at which the inner diameter of the guide member 250 is the first inner diameter D1 and the portion at which the inner diameter of the guide member 250 is the second inner diameter D2 may function as a front restriction stopper of the guide member 250.

The rear stepped portion 252*b* provided at a point at which the inner diameter of the guide member 250 decreases from the second inner diameter D2 to a third inner diameter D3 may be disposed on the inner circumferential surface of the guide member 250.

That is, since the third inner diameter D3 is less than the outer diameter of the support portion 271 of the rotational coupling member 270, the support portion 271 of the rotational coupling member 270 is hooked with the rear stepped portion 252*b* so as to be restricted in backward movement. Therefore, the rear stepped portion 252*b* disposed between the portion at which the inner diameter of the guide member 250 is the second inner diameter D2 and the portion at which the inner diameter of the guide member 250 is the third inner diameter D3 may function as a "rear restriction stopper" of the guide member 250.

The support portion 271 of the rotational coupling member 270 may be elastically deformed through the cutoff portion 271*b*. Thus, in a state in which both the ends of the support portion 271, which defines the cutoff portion 271*b*, are deformed to be adjacent to each other, the support portion 271 may be inserted into the guide member 250. When both the ends of the support portion 271 are deformed to be adjacent through the cutoff portion 271*b*, the support portion 271 has a diameter less than the third inner diameter D3 of the guide member 250. Thus, the guide member 250 may be easily inserted into the interior into the guide member 250.

When the support portion 271 is seated at a position corresponding to the second inner diameter D2 between the front stepped portion 252*a* and the rear stepped portion 252*b*, the support portion 271 is restored to its original shape, and the diameter of the support portion 271 is greater than the first inner diameter D1 or the third inner diameter D3 of the guide member 250 so that the support portion 271 is restricted in forward or backward movement.

For example, the diameter of the support portion 271 may be greater than the first inner diameter D1 or the third inner diameter D3 and less than or equal to the second inner diameter D2.

In this case, there is no need to provide a separate stopper for restricting the forward and rearward movement of the support portion 271 of the rotational coupling member 270. Also, since there is no need to press-fit the support portion 271 of the rotational coupling member 270 into the guide member 250, maintenance may be easy, and since the support portion 271 is seated between the front stepped portion 252*a* and the rear stepped portion 252*b*, the coupling position may be precisely controlled.

Figure 11:
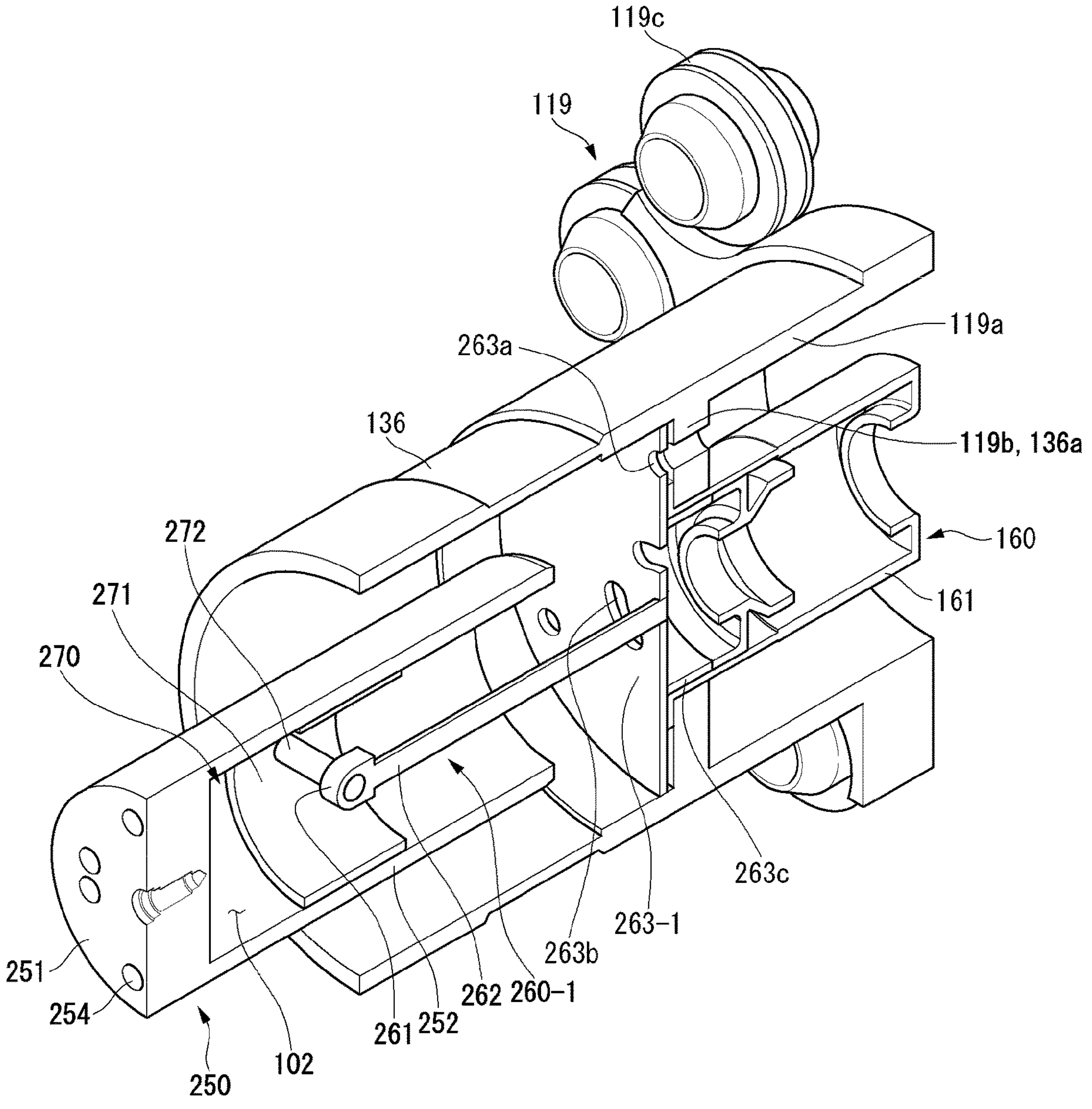
FIG. 11 is a perspective view illustrating a cross-section of a driver of a compressor according to a second embodiment.
Figure 12:
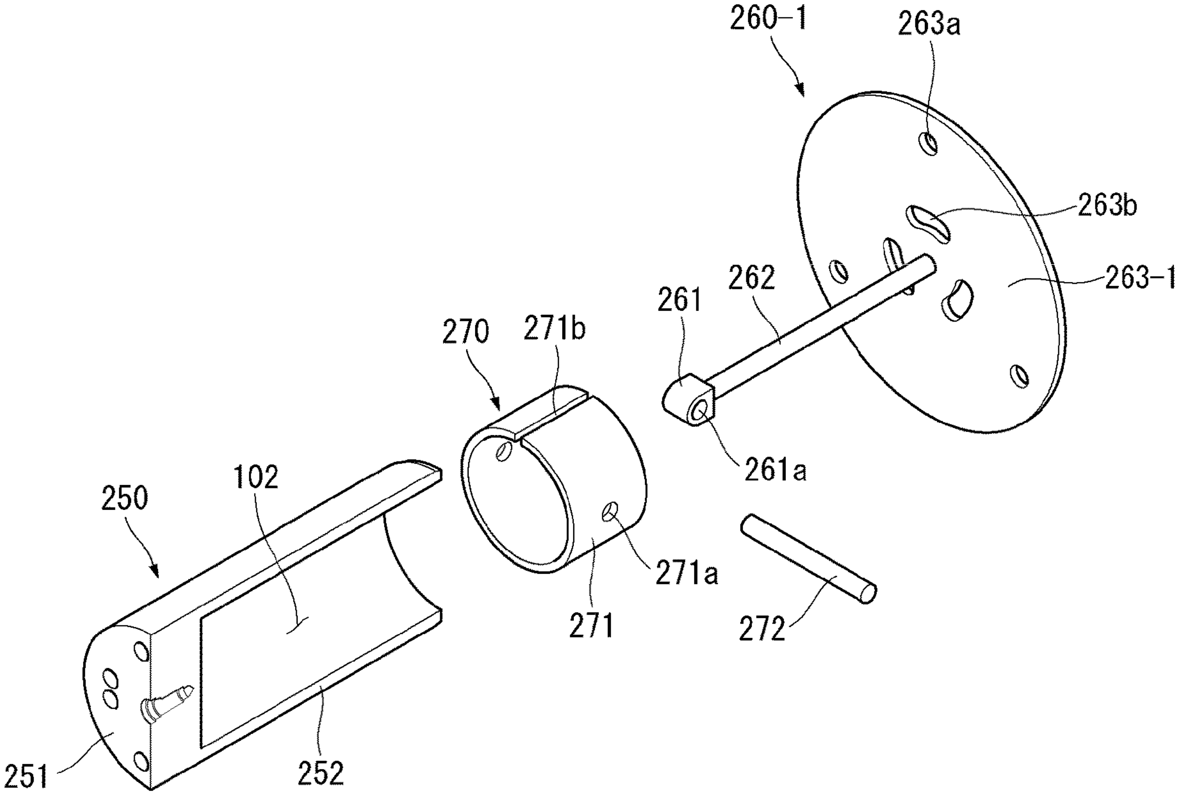
FIG. 12 is an exploded perspective view of a piston structure according to the second embodiment.

FIG. 11 is a perspective view illustrating a cross-section of a driver of a compressor according to a second embodiment, and FIG. 12 is an exploded perspective view of a piston structure according to the second embodiment.

Referring to FIGS. 11 and 12, a mount member 260 may include a mount extension portion 262 extending in a central axis direction, a joint portion 261 connected to one side of the mount extension portion 262 and coupled to be rotatable with respect to a shaft member 272, and a mount coupling portion 263-1 connected to the other side of the mount extension portion 262 and coupled to a driver frame.

The mount extension portion 262 may have a bar shape extending in the central axis direction. The one side of the mount extension portion 262, to which the joint portion 261 is connected, may be accommodated in a guide member 250, and the other side of the mount extension portion 262, to which the mount coupling portion 263-1 is connected, may be disposed outside the rear of the guide member 250.

The joint portion 261 may be connected to a front end of the mount extension portion 262 and may have a through-hole 261*a* through which the shaft member 272 of a rotational coupling member 270 passes. An extension direction of the through-hole 261*a* may be perpendicular to the extending direction of the mount extension portion 262.

The mount coupling portion 263-1 according to the second embodiment may be provided in a plate shape extending in a vertical direction from a rear end of the mount extension portion 262. For example, the mount coupling portion 263-1 may be provided as a circular plate, and the mount extension portion 262 may extend in the vertical direction from a center of the mount coupling portion 263-1.

An outer circumferential portion of the mount coupling portion 263-1 may be coupled to a spring support 119. For example, a cylindrical coupling protrusion 263*c* may extends from the rear of the mount coupling portion 263-1, and the coupling protrusion 263*c* may be inserted and fitted into the coupling portion 119*b* of the spring support 119. That is, the coupling portion 119*b* of the spring support 119 may support two or more points of an outer circumferential surface of the coupling protrusion 263*c*.

The mount coupling portion 263-1 may be coupled to a spring support 119 or a magnet frame 136 together with a muffler unit 160. For example, the coupling protrusion 263*c* may be inserted and fitted into a front opening of the muffler unit 160, and a front portion of the muffler unit 160 may be inserted and fitted into a coupling portion 119*b* of the spring support 119.

A communication hole 263*b* through which a refrigerant introduced from the muffler unit 160 may pass may be defined in the mount coupling portion 263-1. For example, the communication hole 263*b* may be provided as a circular or arc-shaped opening and may be provided in a plurality in a circumferential direction of the mount coupling portion 263-1.

The mount coupling portion 263-1 may be coupled to the spring support 119 or the magnet frame 136. For example, as illustrated in FIG. 6, a coupling hole 263*a* of the mount member 263-1 may be defined to correspond to a coupling hole 263 defined in the support portion 119*c* of the spring support 119, and a separate coupling member may pass through the coupling holes.

Figure 13:
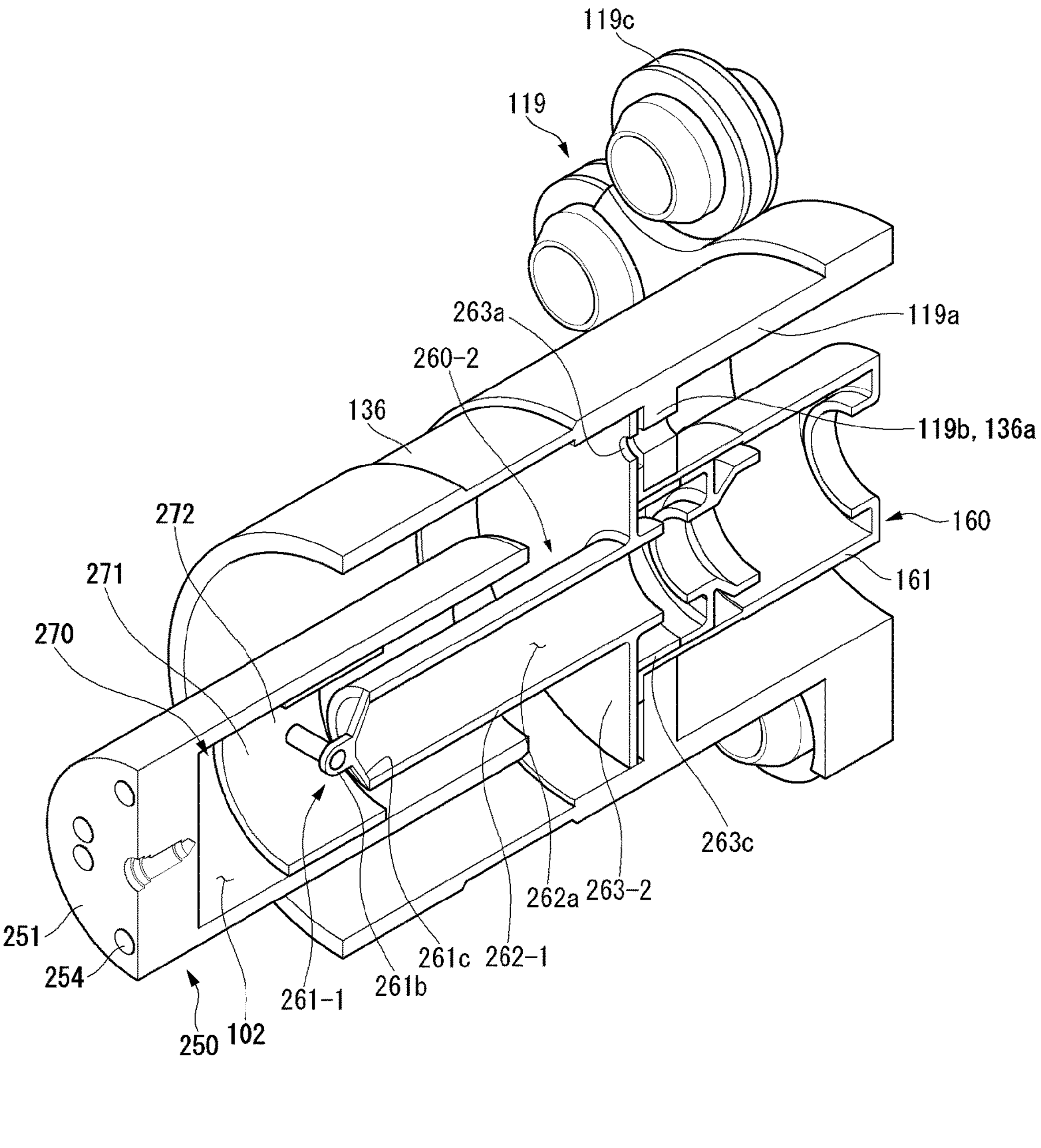
FIG. 13 is a perspective view illustrating a cross-section of a driver of a compressor according to a third embodiment.
Figure 14:
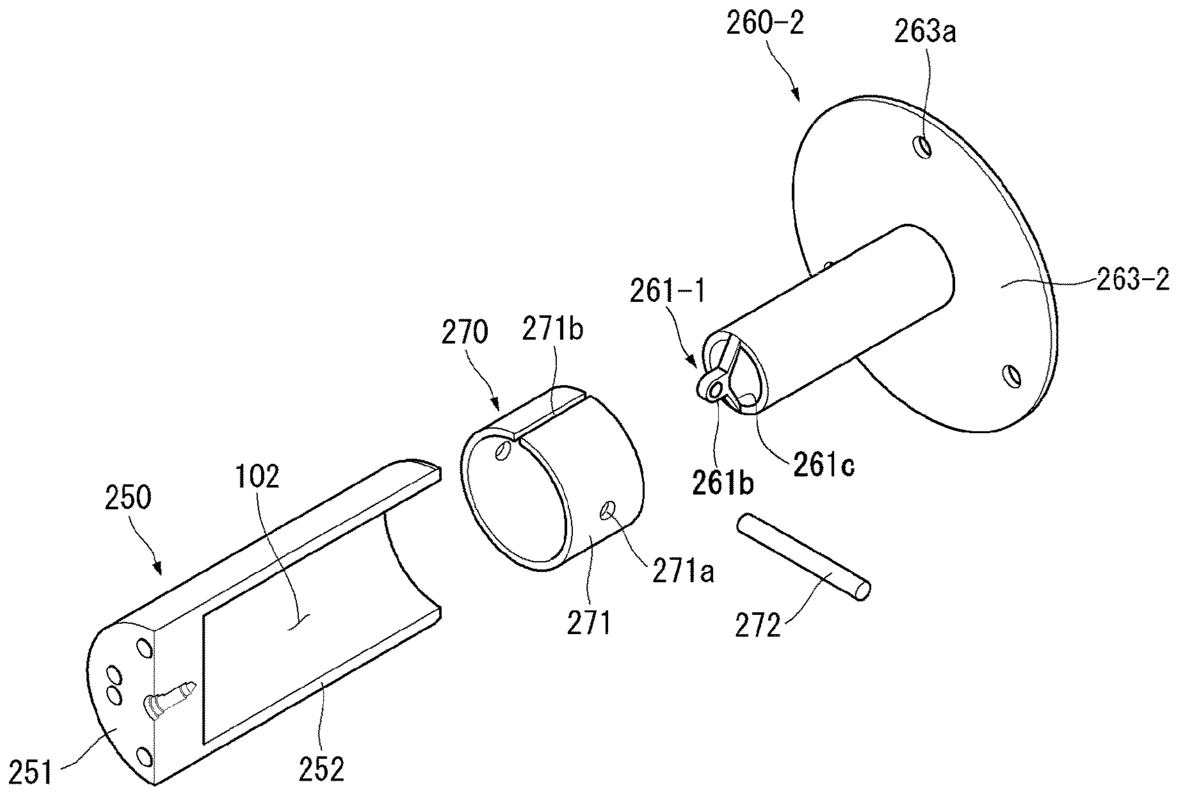
FIG. 14 is an exploded perspective view of a piston structure according to the third embodiment.

FIG. 13 is a perspective view illustrating a cross-section of a driver of a compressor according to a third embodiment, and FIG. 14 is an exploded perspective view of a piston structure according to the third embodiment.

Referring to FIGS. 13 and 14, a mount member 260 may include a mount extension portion 262-1 extending in a central axis direction, a joint portion 261-1 connected to one side of the mount extension portion 262-1 and coupled to be rotatable with respect to a shaft member 272, and a mount coupling portion 263-2 connected to the other side of the mount extension portion 262-1 and coupled to a driver frame.

The mount extension portion 262-1 may have a pipe shape extending in a central axis direction.

One side of the mount extension portion 262-1 to which the joint portion 261-1 is connected may be accommodated in a guide member 250, and the other side of the mount extension portion 262-1 to which the mount coupling portion 263-2 is connected may be disposed outside the rear of the guide member 250.

In detail, a point at which the mount extension portion 262-1 and the mount coupling portion 263-2 are connected to each other may be disposed axially rearward than the guide member 250. That is, a point at which the mount extension portion 262-1 and the mount coupling portion 263-2 are connected to each other may be axially spaced apart from a rear end of the guide member 250.

The mount extension portion 262-1 is provided in a hollow cylindrical shape so that front end and the rear ends thereof are opened, and a refrigerant introduced from a muffler unit 160 through an internal communication path 262*a* defined therein may be guided to a suction space 102.

The joint portion 261-1 may be connected to a front end or front side of the mount extension portion 262-1.

The joint portion 261-1 includes a rotational shaft accommodation member 261*b*, to which the shaft member 272 of the rotational coupling member 270 is rotatably coupled, and a bridge 261*c* connecting the rotational shaft accommodation member 261*b* to the mount extension portion 262-1.

A through-hole 261*a* through which the shaft member 272 is inserted may be defined in the rotational shaft accommodation member 261*b*. An extending direction of the through-hole 261*a* may be perpendicular to the extending direction of the mount extension portion 262-1.

That is, the direction in which the shaft member 272 is inserted into the through-hole 261*a* may be perpendicular to the extension direction of the mount extension portion 262-1.

The bridge 261*c* may couple the rotational shaft accommodation member 261*b* to the mount extension portion 262-1. For example, the bridge 261*c* may have one side connected to a pipe-shaped front end of the mount extension portion 262-1 and the other side connected to the rotational shaft accommodation member 261*b*.

Two or more bridges 261*c* may be provided in a circumferential direction of the pipe-shaped front end of the mount extension portion 262-1. In the drawing, it is shown that two bridges 261*c* are provided at positions opposite to each other, but unlike this, three bridges 261*c* are disposed at intervals of about 120 degrees, or more bridges 261*c* may be provided.

When a plurality of bridges 261*c* are provided, the refrigerant passing through the internal communication path 262*a* may pass through a space between the adjacent bridges 261*c*.

Alternatively, the joint portion 261-1 may pass through a front end side of the mount extension portion 262-1 and may be provided in the internal communication path 262*a* of the mount extension portion 262-1. In this case, the joint portion 261-1 may be coupled without the separate bridge 261*c*.

The mount coupling portion 263-2 may be provided in a plate shape extending in a vertical direction from the rear end of the mount extension portion 262-1. For example, the mount coupling portion 263-2 may be provided as a circular plate, and the mount extension portion 262-1 may extend in the vertical direction from a center of the mount coupling portion 263-2.

An outer circumferential portion of the mount coupling portion 263-2 may be coupled to a spring support 119. For example, a cylindrical coupling protrusion 263*c* may extends from the rear of the mount coupling portion 263-2, and the coupling protrusion 263*c* may be inserted and fitted into the coupling portion 119*b* of the spring support 119. That is, the coupling portion 119*b* of the spring support 119 may support two or more points of an outer circumferential surface of the coupling protrusion 263*c*.

The mount coupling portion 263-2 may be coupled to a spring support 119 or a magnet frame 136 together with a muffler unit 160. For example, the coupling protrusion 263*c* may be inserted and fitted into a front opening of the muffler unit 160, and a front portion of the muffler unit 160 may be inserted and fitted into a coupling portion 119*b* of the spring support 119.

A communication hole through which a refrigerant introduced from the muffler unit 160 passes may be defined in the mount coupling portion 263-2. The communication hole may be defined in a rear end of the inner communication path 262*a* of the mount extension portion 262-1.

The mount coupling portion 263-2 may be coupled to the spring support 119 or the magnet frame 136. For example, the coupling hole 263*a* of the mount coupling member 263-2 may be defined to correspond to the coupling hole defined in the support portion 119*c* of the spring support 119, and a separate coupling member (not shown) may pass through the coupling holes.

In the piston structure according to this embodiment, the guide member 250 may be coupled to be rotatable with respect to the mount member 260 in two or more axes. For example, when viewed from a front side of the guide member 250, the guide member 250 may be tilted upward or backward with respect to an axis (x-axis) in a 3 o'clock to 9 o'clock direction, and simultaneously, may be tilted to a left or right side with respect to an axis (y-axis) in a 12 o'clock to 6 o'clock direction.

Alternatively, the guide member 250 may be capable of both rotating and tilting with respect to the mount member 260 about a rotational axis direction and rotation with respect to the mount member 260 about a rotational axis in a driving axis direction.

For this, the guide member 250 and the mount member 260 may be coupled to each other through a ball joint, a spherical joint, a rod end joint, or a universal joint.

Figure 15:
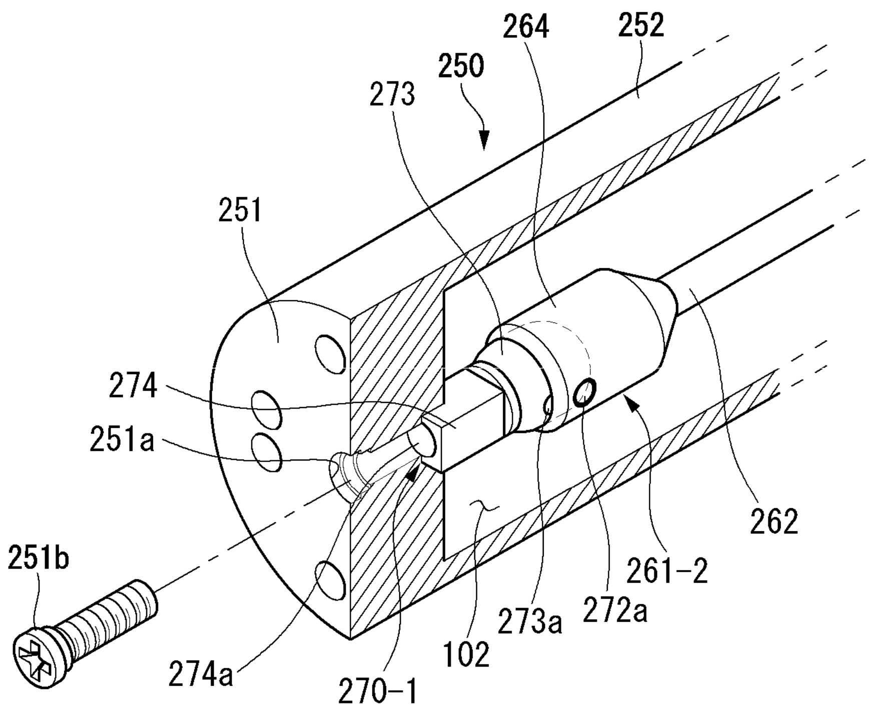
FIG. 15 is an exploded perspective view of a piston structure according to a fourth embodiment.
Figure 15:
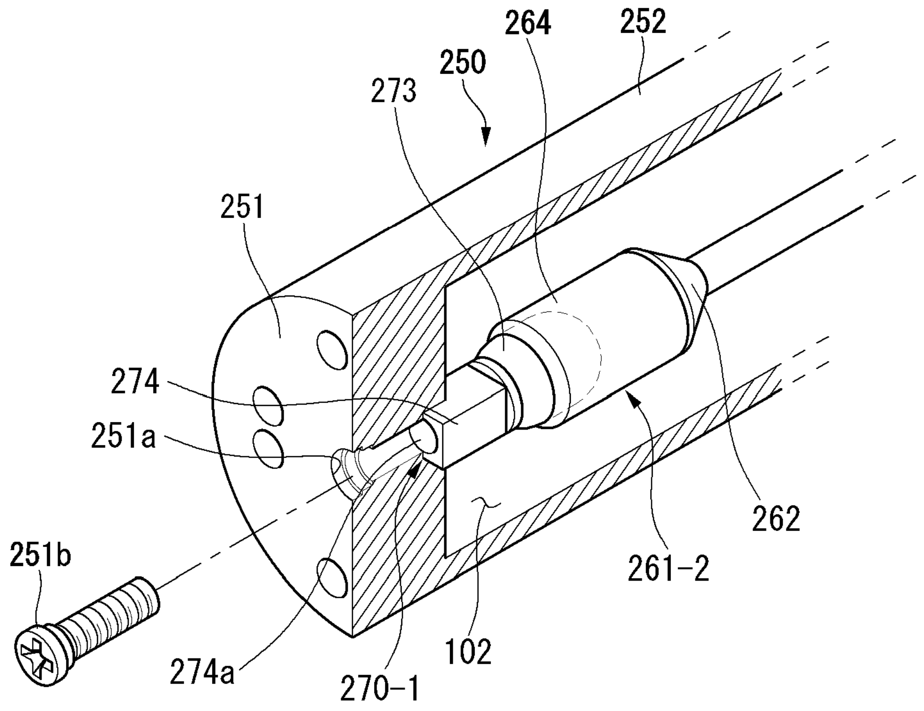

FIG. 15 is an exploded perspective view of a piston structure according to a fourth embodiment.

Referring to FIG. 15, a guide member 250 and a mount member 260 may be connected to each other through coupling using a ball joint. A portion of a socket 264 of the ball joint may be provided on a joint portion 261-2, and a portion of a ball 273 may be provided on a rotational coupling member 270-1.

When the ball 273 and the socket 264 are coupled through a guide shaft 272*a* passing through the ball 273 as illustrated in (a) of FIG. 15, the ball 273 may be tilted in two directions. That is, the guide shaft 272*a* may be tilted in a direction (upward and downward directions in the drawing) perpendicular to a longitudinal direction of the guide shaft 272*a* and may be tilted in the longitudinal direction (left and right directions in the drawing) of the guide shaft 272*a* along a long hole 273*a* of the ball 273, in which the guide shaft 272*a* is accommodated.

Alternatively, as illustrated in FIG. (b) of 15, when the ball 273 and the socket 264 are coupled to each other without an axis, the ball 273 may be freely tilted or rotate within the socket 264.

The rotational coupling member 270-1 may further include a protruding coupling portion 274 connected forward from one side of the ball 273. The protruding coupling portion 274 may be coupled to a rear side of a head portion 251.

For example, the protruding coupling portion 274 may be seated in a groove that is recessed in a shape corresponding to a front shape of the protruding coupling portion 274 on a rear surface of the head portion 251. Here, the protruding coupling portion 274 may be provided in a polygonal shape, and the groove that is recessed into the head portion 251 may also be provided in a shape corresponding thereto to prevent the protruding coupling portion 274 from rotating with respect to the head portion 251.

The protruding coupling portion 274 may be coupled together through a suction valve coupling hole 251*a* and a coupling member 251*b*, which are defined in front of the head portion 251 so as to be coupled to a suction valve 155 (see FIG. 1).

A rotational coupling member coupling hole 274*a* communicating with the suction valve coupling hole 251*a* may be defined in the protruding coupling portion 274. For example, the coupling member 251*b* passing through the suction valve 155 may be sequentially screw-coupled to the suction valve coupling hole 251*a* and the rotational coupling member coupling hole 274*a* of the head portion 251.

Figure 16:
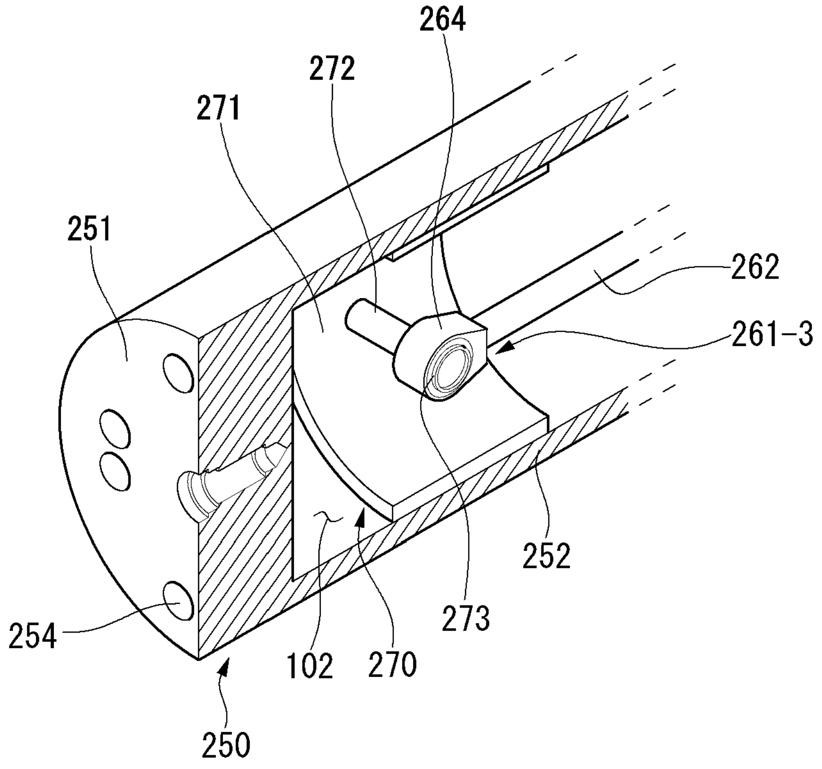
FIG. 16 is an exploded perspective view of a piston structure according to a fifth embodiment.

FIG. 16 is an exploded perspective view of a piston structure according to a fifth embodiment.

Referring to FIG. 16, a guide member 250 and a mount member 260 may be connected to each other through a spherical joint or a rod end joint. A ring portion 264 of the rod end joint may be provided in a joint portion 261-3, and a ball portion 273 through which a shaft member 272 passes may be provided in a rotational coupling member 270.

The ball portion 273 through which the shaft member 272 passes is bearing-coupled within the ring portion 264 and thus be freely rotatable. Thus, the guide member 250 may be rotatable within a number of angles with respect to the mount member 260 in all directions.

Figure 17:
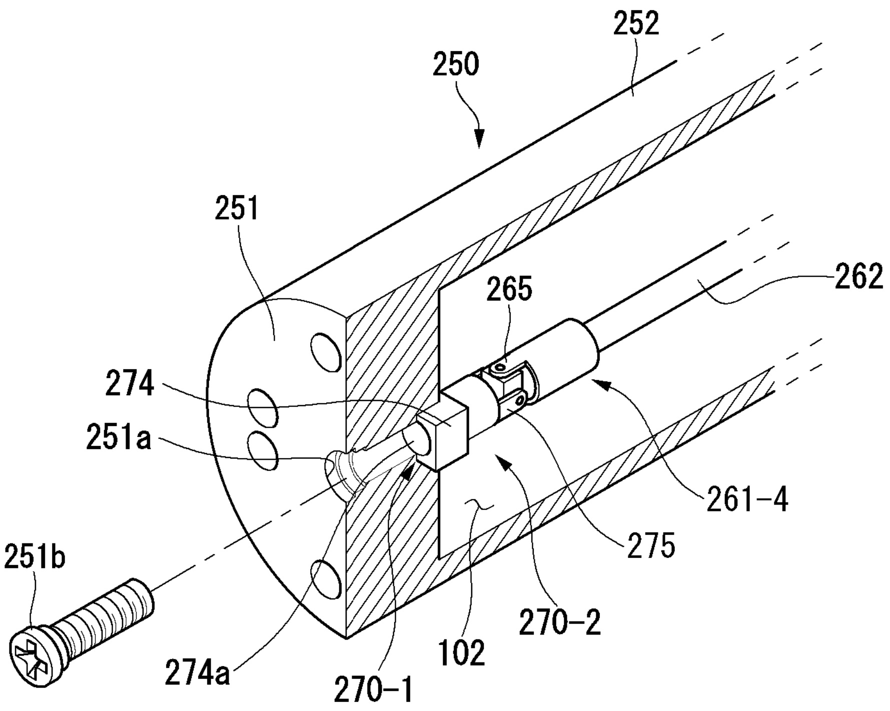
FIG. 17 is an exploded perspective view of a piston structure according to a sixth embodiment.

FIG. 17 is an exploded perspective view of a piston structure according to a sixth embodiment.

Referring to FIG. 17, a guide member 250 and a mount member 260 may be connected to each other through coupling using a universal joint. A first yoke 265 of the universal joint may be provided in a joint portion 261-2, and a second yoke 275 may be provided in a rotational coupling member 270-2.

The rotational coupling member 270-2 may further include a protruding coupling portion 274 connected forward from one side of the second yoke 275. The protruding coupling portion 274 may be coupled to a rear side of a head portion 251.

For example, the protruding coupling portion 274 may be seated in a groove that is recessed in a shape corresponding to a front shape of the protruding coupling portion 274 on a rear surface of the head portion 251. Here, the protruding coupling portion 274 may be provided in a polygonal shape, and the groove that is recessed into the head portion 251 may also be provided in a shape corresponding thereto to prevent the protruding coupling portion 274 from rotating with respect to the head portion 251.

The protruding coupling portion 274 may be coupled together through a suction valve coupling hole 251*a* and a coupling member 251*b*, which are defined in front of the head portion 251 so as to be coupled to a suction valve 155 (see FIG. 1). A rotational coupling member coupling hole 274*a* communicating with the suction valve coupling hole 251*a* may be defined in the protruding coupling portion 274.

For example, the coupling member 251*b* passing through the suction valve 155 may be sequentially screw-coupled to the suction valve coupling hole 251*a* and the rotational coupling member coupling hole 274*a* of the head portion 251.

Although not shown in the drawing, the first yoke 265 may be coupled through a shaft bearing to be rotatable with respect to the mount extension portion 262. Thus, the guide member 250 may be rotatable within a number of angles with respect to the mount member 260 in all directions.

Some or other embodiments described above are not mutually exclusive or distinct. Some or other embodiments described above may have their respective configurations or functions, which are used together or combined with each other.

For example, it means that a configuration A described in a specific embodiment and/or a drawing may be combined with a configuration B described in another embodiment and/or a drawing. That is, even if the combination between the components is not directly described, the combination is possible except for the case where the combination is not described.

The detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The compressor according to the embodiments may perform the self-aligning function when the eccentricity or moment occurs in the cylinder by employing the structure capable of rotating in the cylinder. Thus, the contact between the piston and the cylinder may be prevented to prevent the particles from being generated, thereby improving durability life of the piston and the cylinder.

In addition, according to at least one of the embodiments, the structure in which the piston is rotatable may be employed to be tiltable in the multiaxial direction.

In addition, according to at least one of the embodiments, the multiaxial rotational structure, for example, the universal joint structure may be employed to enable the tilting in the multiaxial direction.

In addition, according to at least one of the embodiments, the rotational shaft may be provided at the position corresponding to the center of gravity of the piston to prevent the moment from being applied by the pressure of the lubricating refrigerant, which is applied to the front and rear sides of the piston.

In addition, according to at least one of the embodiments, the coupling of the structure that allows the piston to be rotatable may be provided on the head portion to secure easy of the coupling.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor comprising:

a cylinder defining a compression space;

a piston structure accommodated in the cylinder and including a mount member and a guide member, the guide member being configured to reciprocate inside the compression space of the cylinder in an axial direction to compress a refrigerant gas therein; and a magnet frame configured to support a mover, the mover being coupled to the piston structure and configured to move together with the piston structure, wherein the mount member connects the guide member to the magnet frame, wherein the guide member is configured to be rotated with respect to the mount member, wherein the piston structure includes a rotatable coupling member coupled to an inner circumferential surface of the guide member, and wherein the rotatable coupling member includes:

a shaft member inserted into the rotatable coupling member, and a cutoff portion in the axial direction, the cutoff portion configured to be press-fitted to fix the rotatable coupling member to the inner circumferential surface of the guide member.

2. The compressor according to claim 1, wherein the guide member is configured to be tilted with respect to the mount member.

3. The compressor according to claim 2, wherein the rotation of the guide member includes tilting to rotate about a rotational axis in a radial direction.

4. The compressor according to claim 2, further comprising:

a joint portion through which the guide member and the mount member are rotatably coupled to each other, wherein the mount member comprises:

a mount extension portion connected to the joint portion and extending from the joint portion; and a mount coupling portion extending outward from one end of the mount extension portion in a radial direction, the mount coupling portion being connected to the magnet frame.

5. The compressor according to claim 4, wherein the mount coupling portion is provided in a plate shape and includes a communication hole, the communication hole configured to allow a suction muffler disposed adjacent to the piston structure and the guide member to communicate with each other.

6. The compressor according to claim 5, wherein the mount extension portion is provided in a bar shape and extends from a central portion of the mount coupling portion, and wherein the communication hole is defined around the mount extension portion extending from the central portion of the mount coupling portion.

7. The compressor according to claim 4, wherein the mount extension portion is provided in a tubular shape and extends from a central portion of the mount coupling portion, wherein the mount coupling portion defines an opening configured to allow a suction muffler disposed adjacent to the piston structure and the guide member to communicate with each other, and wherein the mount coupling portion is configured to guide a refrigerant from a muffler unit into an inner space of the mount extension portion.

8. The compressor according to claim 1, wherein the shaft member passes through a central axis of the piston structure and is disposed at an inner space of the guide member, wherein the mount member comprises:

a joint portion rotatably coupled to the shaft member;

a mount extension portion extending from the joint portion; and a mount coupling portion extending outward from one end of the mount extension portion in a radial direction, the mount coupling portion being connected to the magnet frame.

9. The compressor according to claim 1, wherein the rotatable coupling member is provided in a band or partial band shape.

10. The compressor according to claim 9, wherein the guide member includes a front stepped portion having a first inner diameter and a second inner diameter, wherein an inner diameter of the guide member increases from the first inner diameter to the second inner diameter within the front stepped portion, and wherein the front stepped portion is configured to restrict a forward movement of the rotatable coupling member.

11. The compressor according to claim 10, wherein the rotatable coupling member is rotatably provided inside the guide member.

12. The compressor according to claim 10, wherein an outer diameter of the rotatable coupling member is (i) greater than the first inner diameter and (ii) less than the second inner diameter.

13. The compressor according to claim 10, wherein the guide member includes a rear stepped portion having the second inner diameter and a third inner diameter, wherein the inner diameter of the guide member decreases from the second inner diameter to the third inner diameter within the rear stepped portion, and wherein the rear stepped portion is configured to restrict a backward movement of the rotatable coupling member.

14. The compressor according to claim 1, wherein a rear end of the guide member is spaced apart from the mount member.

15. A compressor comprising:

a cylinder defining a compression space;

a piston structure accommodated in the cylinder and including a mount member and a guide member, the guide member being configured to reciprocate inside the compression space of the cylinder in an axial direction to compress a refrigerant gas therein; and a magnet frame configured to support a mover, the mover being coupled to the piston structure and configured to move together with the piston structure, wherein the mount member connects the guide member to the magnet frame, wherein the guide member is configured to be rotated with respect to the mount member, wherein the piston structure includes a rotatable coupling member coupled to an inner circumferential surface of the guide member, wherein the rotatable coupling member includes:

a support portion supported inside the guide member, and a shaft member inserted into the support portion, wherein the mount member comprises:

a joint portion rotatably coupled to the shaft member, a mount extension portion extending from the joint portion, and a mount coupling portion extending outward from one end of the mount extension portion in a radial direction, the mount coupling portion being connected to the magnet frame, wherein the joint portion is disposed at the support portion and defines a through-hole through which the shaft member is inserted, and wherein the shaft member passes through a central axis of the piston structure and is disposed at a center of gravity of the guide member to thereby reduce moment caused by eccentricity of the piston structure.

16. The compressor according to claim 15, wherein an extension direction of the through-hole is perpendicular to an extension direction of the mount extension portion.

17. The compressor according to claim 15, wherein the mount extension portion has a bar shape extending in the axial direction.

18. The compressor according to claim 15, the support portion is provided in a band or partial band shape.

19. The compressor according to claim 15, wherein a length of the shaft member is less than an inner diameter of the guide member or an outer diameter of the support portion, based on the shaft member being inserted into the guide member.

* * * * *